United States Patent
Bach et al.

(10) Patent No.: US 9,751,568 B2
(45) Date of Patent: Sep. 5, 2017

(54) BODY FRAME STRUCTURE FOR A VEHICLE

(71) Applicant: Honda Motor Co., Ltd., Tokyo (JP)

(72) Inventors: Edward W. Bach, Galloway, OH (US); Hirokazu Matsuura, Dublin, OH (US); Adam J. Rompage, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 14/960,795

(22) Filed: Dec. 7, 2015

(65) Prior Publication Data
US 2017/0158244 A1 Jun. 8, 2017

(51) Int. Cl.
*B62D 25/02* (2006.01)
*B62D 25/04* (2006.01)
*B62D 27/02* (2006.01)
*B62D 21/15* (2006.01)

(52) U.S. Cl.
CPC ............ *B62D 25/02* (2013.01); *B62D 21/157* (2013.01); *B62D 25/025* (2013.01); *B62D 25/04* (2013.01); *B62D 27/023* (2013.01)

(58) Field of Classification Search
CPC .... B62D 21/157; B62D 25/02; B62D 25/025; B62D 25/04; B62D 27/023
See application file for complete search history.

(56) References Cited

U.S. PATENT DOCUMENTS

| | | | |
|---|---|---|---|
| 5,094,504 A * | 3/1992 | Wurl | B62D 25/025 296/202 |
| 5,190,207 A | 3/1993 | Peck et al. | |
| 5,372,400 A | 12/1994 | Enning et al. | |
| 5,382,071 A | 1/1995 | Enning et al. | |
| 5,820,204 A * | 10/1998 | Masuda | B62D 21/157 296/187.12 |
| 6,003,898 A | 12/1999 | Teply et al. | |
| 6,131,286 A | 10/2000 | Kelly et al. | |
| 6,139,094 A * | 10/2000 | Teply | B62D 23/005 296/203.03 |

(Continued)

FOREIGN PATENT DOCUMENTS

| | | | |
|---|---|---|---|
| DE | 19538457 A1 * | 4/1997 | ............ B62D 25/02 |
| DE | 19648495 | 5/1997 | |

(Continued)

*Primary Examiner* — Glenn Dayoan
*Assistant Examiner* — Paul Chenevert
(74) *Attorney, Agent, or Firm* — Rankin, Hill & Clark LLP

(57) ABSTRACT

A vehicle frame structure includes a side sill having an internal space partitioned by a vertical rib and a horizontal rib intersecting the vertical rib. The vertical rib separates the side sill into an outer lateral portion and an inner lateral portion. The inner lateral side sill portion includes a cutout extending vertically therethrough. A pillar has an internal space partitioned by a longitudinally extending first rib and a laterally extending second rib intersecting the first rib. The first rib separates the pillar into an outer lateral portion and an inner lateral portion. The inner lateral pillar portion is disposed through and secured in the cutout of the portion, and an axial end face of the outer lateral pillar portion is in abutment with the outer lateral side sill portion. The side sill and the pillar are welded to each other along an interface between the two components.

21 Claims, 17 Drawing Sheets

(56) References Cited

U.S. PATENT DOCUMENTS

| | | | |
|---|---|---|---|
| 6,205,736 B1 * | 3/2001 | Amborn | B21C 37/294 296/203.01 |
| 6,217,109 B1 * | 4/2001 | Okana | B62D 25/025 296/187.12 |
| 6,293,617 B1 * | 9/2001 | Sukegawa | B62D 25/025 296/203.02 |
| 6,293,618 B1 * | 9/2001 | Sukegawa | B62D 25/04 296/203.01 |
| 6,402,414 B1 * | 6/2002 | Kanodia | B62D 23/005 296/205 |
| 6,824,204 B2 * | 11/2004 | Gabbianelli | B62D 21/152 296/193.06 |
| 6,907,666 B2 | 6/2005 | Mills | |
| 7,386,938 B2 | 6/2008 | Bruggemann et al. | |
| 7,547,063 B2 * | 6/2009 | Stojkovic | B62D 25/04 296/193.05 |
| 7,562,929 B2 * | 7/2009 | Schiebel | B62D 25/025 296/187.12 |
| 7,690,721 B2 | 4/2010 | Grüneklee et al. | |
| 8,272,682 B2 * | 9/2012 | Cimatti | B62D 25/025 296/204 |
| 8,398,159 B1 | 3/2013 | Hall | |
| 8,439,429 B2 | 5/2013 | Shida et al. | |
| 9,248,862 B1 * | 2/2016 | Redmer | B62D 25/04 |
| 2001/0000119 A1 | 4/2001 | Jaekel et al. | |
| 2014/0346816 A1 | 11/2014 | Craig et al. | |
| 2017/0113732 A1 * | 4/2017 | Lee | B62D 25/04 |

FOREIGN PATENT DOCUMENTS

| | | | | |
|---|---|---|---|---|
| DE | WO 2004050459 A1 * | 6/2004 | | B62D 25/02 |
| DE | WO 2004078563 A1 * | 9/2004 | | B62D 25/04 |
| DE | 10314080 A1 * | 10/2004 | | B62D 25/025 |
| DE | 10332029 A1 * | 2/2005 | | B62D 25/04 |
| DE | WO 2005030562 A1 * | 4/2005 | | B21D 39/044 |
| DE | EP 1840007 A2 * | 10/2007 | | B62D 27/023 |
| DE | 102013003697 | 9/2014 | | |
| EP | 1442966 | 8/2004 | | |
| EP | 1498345 | 1/2005 | | |
| EP | 1632422 A2 * | 3/2006 | | B62D 25/04 |
| FR | EP 0733541 A1 * | 9/1996 | | B62D 27/023 |
| JP | H0466375 | 3/1992 | | |
| JP | H04221276 | 8/1992 | | |

* cited by examiner

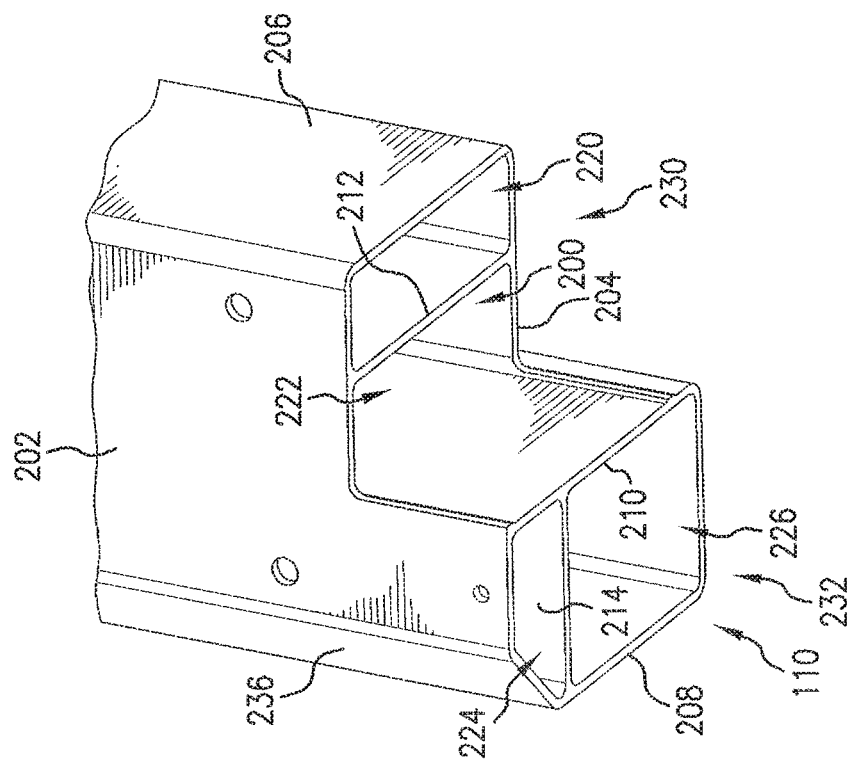
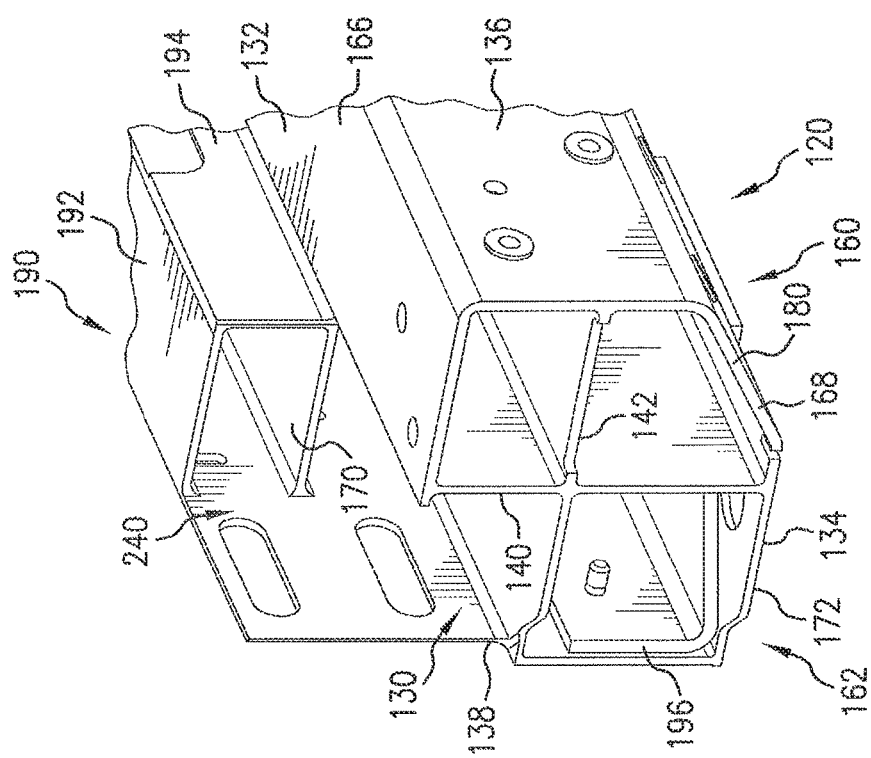
FIG. 3B
FIG. 3A

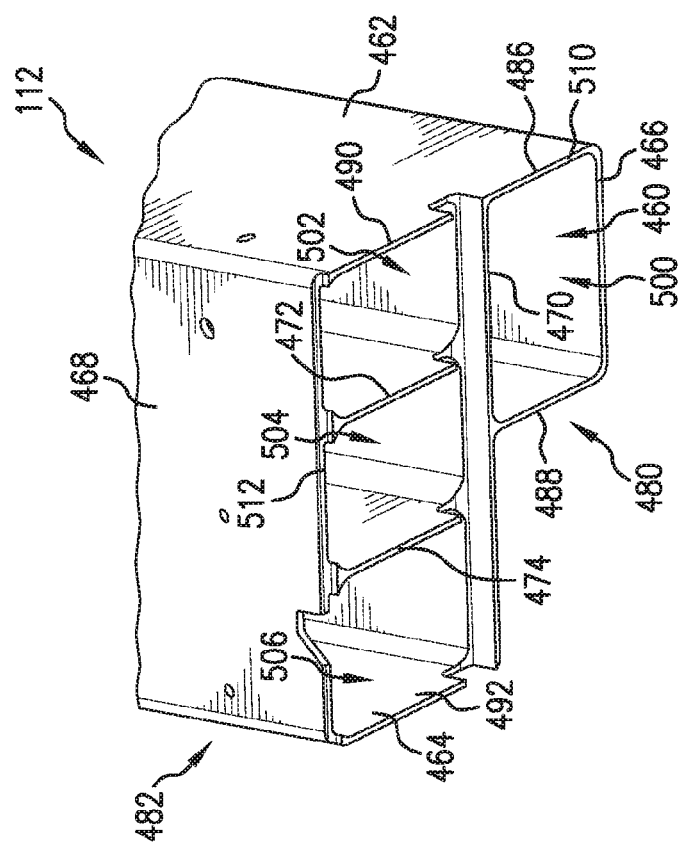
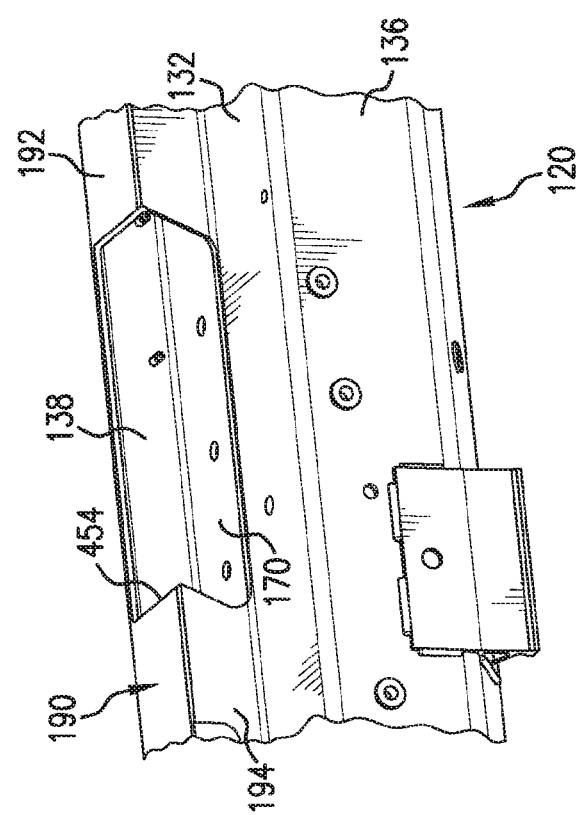
FIG. 11B
FIG. 11A

BODY FRAME STRUCTURE FOR A VEHICLE

BACKGROUND

Generally for vehicle bodies formed of steel the front pillar and the side sill are the same part allowing for smooth and efficient load transfer between the areas of the vehicle. Traditional center pillars are formed of two members spot welded together, and the center pillar inner is spot welded to the bottom of the side sill section. For vehicle bodies formed of aluminum, the front/center pillar and the side sill are two different extrusions fixedly connected together for load transfer between the two parts. By way of example, it is known to weld the front/center pillar extrusion on the top and to the outside of the side sill extrusion. Further, it is known to position a lower part of the pillar extrusion in an opening in the side sill extrusion prior to the connection of the extrusions.

BRIEF DESCRIPTION

In accordance with one aspect, a vehicle frame structure comprises a side sill and a pillar. The side sill extends elongated in a longitudinal direction of a vehicle and has an internal space partitioned by a vertical rib and a horizontal rib intersecting the vertical rib. The vertical rib separates the side sill into an outer lateral side sill portion and an inner lateral side sill portion. The inner lateral side sill portion includes a cutout extending vertically therethrough. The pillar has an internal space partitioned by a longitudinally extending first rib and a laterally extending second rib intersecting the first rib. The first rib separates the pillar into an outer lateral pillar portion and an inner lateral pillar portion. The inner lateral pillar portion is disposed through and secured in the cutout of the inner lateral side sill portion, and an axial end face of the outer lateral pillar portion is in abutment with the outer lateral side sill portion. The side sill and the pillar are welded to each other along an interface between the side sill and the pillar.

In accordance with another aspect, a vehicle frame structure comprises a side sill and a pillar. The side sill extends elongated in a longitudinal direction of a vehicle and has an internal space partitioned by a vertical rib and a horizontal rib intersecting the vertical rib. The vertical rib separates the side sill into an outer lateral side sill portion and an inner lateral side sill portion. The inner lateral side sill portion includes a step portion having a cutout extending vertically therethrough. The pillar has an internal space partitioned by a longitudinally extending first rib and a laterally extending second rib intersecting the first rib. The first rib separates the pillar into an outer lateral pillar portion and an inner lateral pillar portion. The inner lateral pillar portion is disposed through and secured in the cutout of the inner lateral side sill portion, and an axial end face of the inner lateral pillar portion is in abutment with and supported by the horizontal rib of the side sill.

In accordance with yet another aspect, a vehicle frame structure comprises a side sill and a pillar. The side sill extends elongated in a longitudinal direction of a vehicle and has an internal space partitioned by a vertical rib and a horizontal rib intersecting the vertical rib. The vertical rib separates the side sill into an outer lateral side sill portion and an inner lateral side sill portion. The inner lateral side sill portion includes a step portion having a cutout extending vertically therethrough. The pillar has an internal space partitioned by a longitudinally extending first rib and a laterally extending second rib intersecting the first rib. The first rib separates the pillar into an outer lateral pillar portion and an inner lateral pillar portion. The inner lateral pillar portion is disposed through and secured in the cutout of the inner lateral side sill portion, and an axial end face of the inner lateral pillar portion is in abutment with and supported by an inside face of a lower wall of the side sill.

BRIEF DESCRIPTION OF THE DRAWINGS

FIG. 3A is a perspective cross-sectional view of the side sill of FIG. 2.

FIG. 3B is a perspective cross-sectional view of the front pillar of FIG. 2.

FIG. 11A is a perspective cross-sectional view of the side sill of FIG. 9.

FIG. 11B is a perspective cross-sectional view of the center pillar of FIG. 9.

DETAILED DESCRIPTION

It should, of course, be understood that the description and drawings herein are merely illustrative and that various modifications and changes can be made in the structures disclosed without departing from the present disclosure. In general, the figures of the exemplary vehicle body frame structure are not to scale. As used herein, lateral directions are transverse across the vehicle body frame structure, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle body frame structure disclosed herein are merely terms of art that may vary from one manufacturer to another and should not be deemed to limit the present disclosure.

Figure 1:
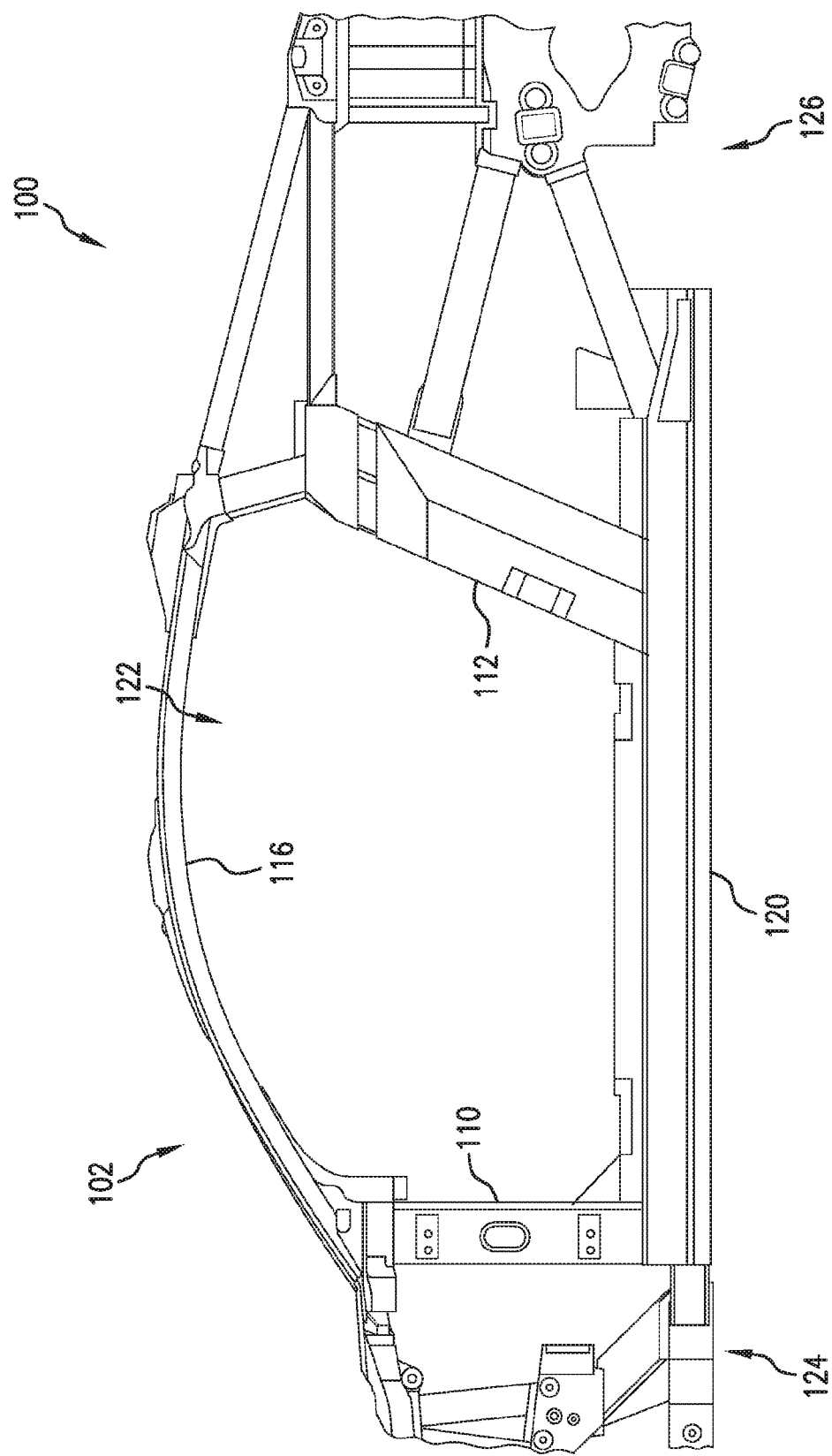
FIG. 1 is a schematic side view of a frame portion of a vehicle body according to the present disclosure.

Referring now to the drawings, wherein like numerals refer to like parts throughout the several views, FIG. 1 schematically illustrates a frame portion of a vehicle body 100 including a side frame structure 102 having a front pillar 110, a center pillar 112 each extending generally in the vertical direction, a longitudinally extending roof side rail 116 located above the pillars 110, 112, and a longitudinally extending side sill 120 located below the pillars 110, 112. These structural elements 110 to 120 define an openings 122 adapted to accommodate a door (not shown). The side frame structure 102 is provided at each of the right and left sides of the vehicle body 100 and may be identically constructed, but for their disposition on opposite sides of the vehicle. Incidentally, the structural elements 110 to 120 of the exemplary side frame structure 102 are constituted by aluminum or aluminum alloy members which are formed by extrusion molding so as the have the necessary sectional shapes respectively, as described below. The vehicle body 100 further includes a front frame structure 124 and a rear frame structure 126 each connected to the side frame structure 102, and a floor panel (not shown) is interposed between the left and right side sills. The features of the front frame structure 124 and rear frame structure 126 are not germane to the present disclosure and will be omitted for conciseness.

Figure 2:
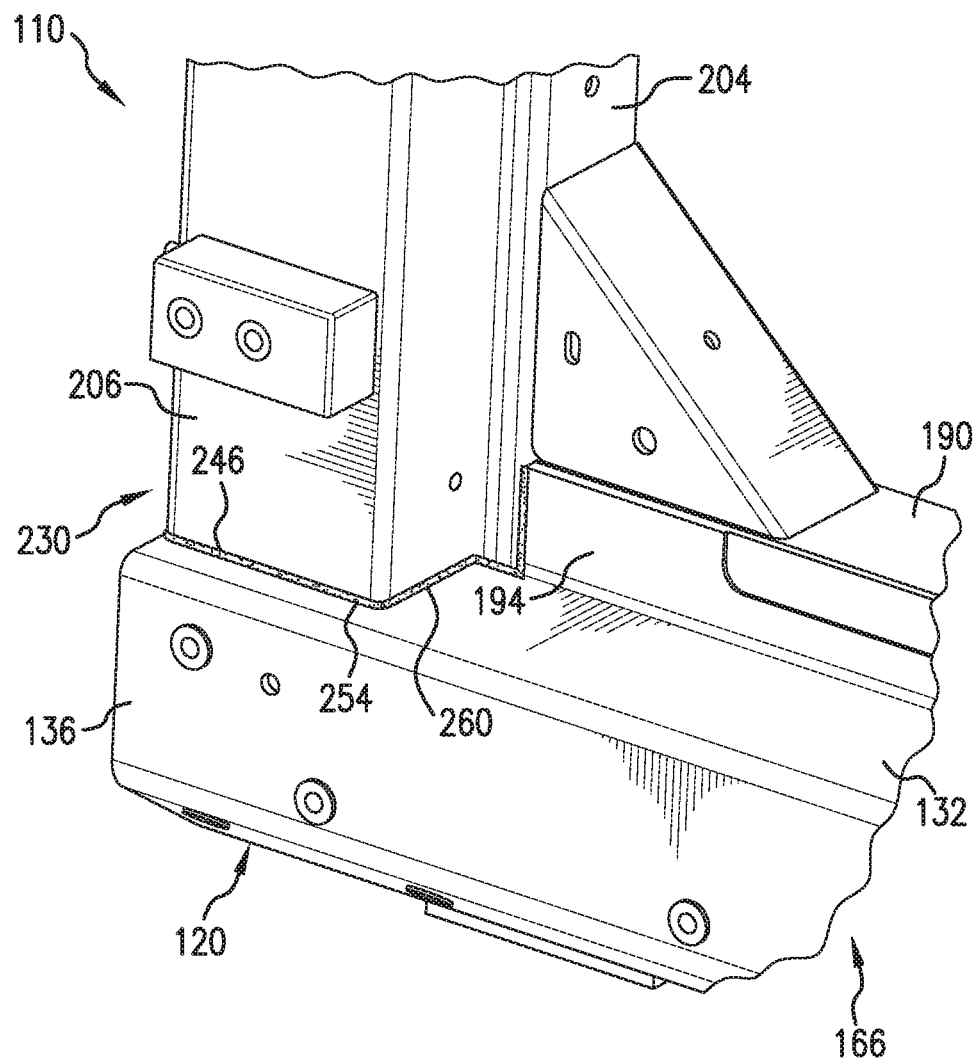
FIG. 2 is an outer lateral side perspective view of a connection between a side sill and a front pillar of the vehicle body of FIG. 1 according to one aspect of the present disclosure.

FIG. 2 is an outer lateral side perspective view of a connection between the front pillar 110 and the side sill 120 of the vehicle body 100 according to one aspect of the present disclosure, and FIGS. 3A and 3B are perspective cross-section views of the side sill 120 and the front pillar 110. As depicted, the side sill 120 is elongated in the longitudinal direction of the vehicle body 100 and has a hollow generally box-like cross-section having an internal space 130 therein which is defined by an upper wall 132, a lower wall 134, an outer lateral side wall 136, and an inner lateral side wall 138. The side walls 136, 138 are located on, respectively, the outer and inner sides with respect to the vehicle body 100. In this sense, the side walls 136, 138 are referred to as the outer lateral side wall and the inner lateral side wall, respectively. The internal space 130 is partitioned by first strengthening rib 140 and a second strengthening rib 142. The first rib 140 is elongated in the longitudinal direction of the vehicle body and is vertically oriented to connect respective inside faces of the upper and lower walls 132, 134. The second rib 142 is elongated in the longitudinal direction of the vehicle body and is horizontally oriented to connect respective inside faces of the outer and inner lateral side walls 136, 138. Accordingly, the perpendicularly crossed vertical and horizontal ribs 140, 142 interconnect the walls of the side sill 120.

The first rib 140 separates the side sill 120 into an outer lateral portion 160 and an inner lateral portion 162. The outer lateral portion 160 is therefore defined by an outer lateral section 166 of the upper wall 132, an outer lateral section 168 of the lower wall 134, the outer side wall 136 and an outer face of the first rib 140. The inner lateral portion 162 is defined by an inner lateral section 170 of the upper wall 132, an inner lateral section 172 of the lower wall 134, the inner side wall 138 and an inner face of the first rib 140. The side sill 120 further includes an angled wall portion 180 extending in the longitudinal direction of the vehicle body 100 and connecting the lower wall 134 and the outer side wall 136. The angled wall portion 180 defines part of the outer lateral portion 160 of the side sill 120 and can define a mounting location for a side sill garnish (not shown). As shown, the angled wall portion 180 defines the outer lateral section 168 of the lower wall 134. The side sill 120 further includes a step portion 190 provided on the inner lateral section 170 of the upper wall 132. The step portion 190 has a hollow generally box-like cross-section and is defined by an upper portion of the inner side wall 138, the inner lateral section 170 of the upper wall 132, an upper horizontal wall part 192, and an outer vertical wall part 194. The outer vertical wall part 194 can be located laterally inwardly of the first rib 140. Further, a stiffener 196 can be secured to the inner lateral section 172 of the lower wall 134.

The front pillar 110 is elongated in the vertical direction of the vehicle body 100 and has an internal space 200 defined by a forward wall 202, a rear wall 204, an outer lateral side wall 206, and an inner lateral side wall 208. The internal space 200 is partitioned by a plurality of strengthening ribs. As depicted in FIG. 3B, longitudinally extending first and second ribs 210, 212 connect inside faces of the forward wall 202 and the rear wall 204. A laterally extending third rib 214 connects an inside face of the inner side wall 208 and the first rib 210. The first, second, and third ribs 210, 212, 214 separate the front pillar 110 into a plurality of interior hollow portions, and more particularly into four hollow portions 220 to 226. The two laterally adjacent hollow portions 220, 222 define an outer lateral portion 230 of the front pillar 110 and the two longitudinally adjacent hollow portions 224, 226 define an inner lateral portion 232 of the front pillar 110. The inner lateral portion 232 of the front pillar 110 can have a length greater than a length of the outer lateral portion 230. The front pillar 110 further includes an angled wall portion 236 extending in the vertical direction and connecting the forward wall 202 and the inner side wall 208. The angled wall portion 236 defines part of the inner lateral portion 232 of the front pillar 110 and the third rib 214 can be located rearward of the connection of the angled wall portion 236 and the inner side wall 208. It should be appreciated that the hollow portions 220 to 226 can each be configured as an energy absorbing lobe of the front pillar 110.

Figure 4:
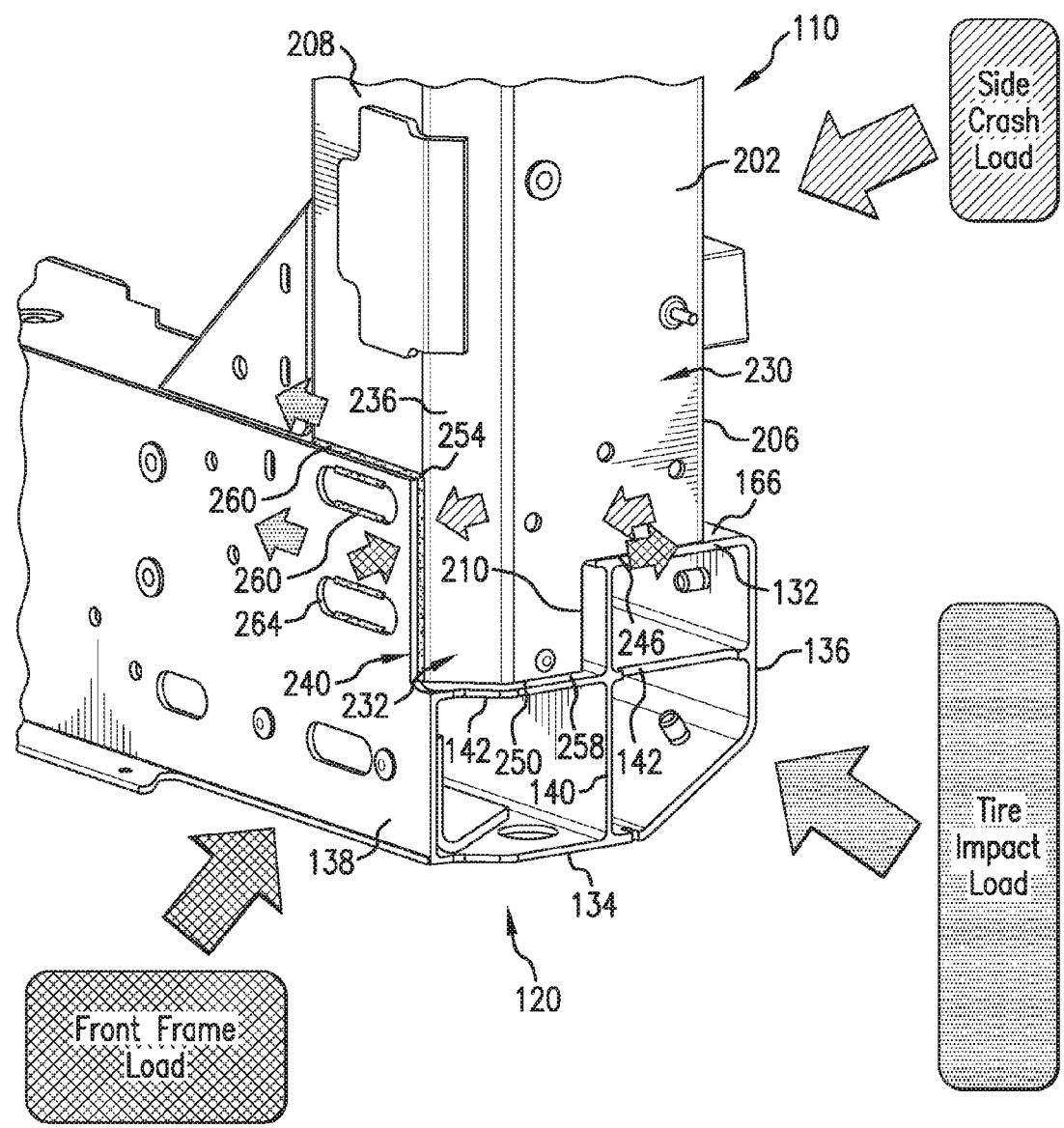
FIG. 4 depicts a force or load distribution of the connection of FIG. 2.

With reference now to FIG. 4, the inner lateral portion 162 of the side sill 120, and more particularly the step portion 190, includes a cutout 240 extending vertically therethrough. The inner lateral portion 232 of the front pillar 110 is disposed through and secured in the cutout 240 of the inner lateral side sill portion 162 such that the first rib 210 of the front pillar faces the vertical rib 140 of the side sill 120. An axial end face 246 of the outer lateral portion 230 of the front pillar 110 is in abutment with the outer lateral portion 160 of the side sill 120. More particularly, the axial end face 246 sits atop the outer lateral section 166 of the side sill upper wall 132, and an axial end face 250 of the inner lateral portion 232 of the front pillar 110 is in abutment with and supported by the horizontal rib 142 of the side sill 120. A gap 258 is provided at the contact between the inner lateral portion 232 and the horizontal rib 142 which allows for larger trim tolerances to eliminate a machining process generally associated with the connection between the front pillar and side sill. The front pillar 110 is welded to the side sill 120 along a juncture or interface 254 between the front pillar and side sill. In the depicted embodiment, the front pillar 110 is welded to the side sill 120 at the location where the axial end face 246 of the outer lateral portion 230 of the front pillar 110 sits atop the outer lateral section 166 of the upper wall 132 of the side sill 120. The front pillar 110 is also welded to the inner lateral side wall 138 of the side sill 120. As shown in FIGS. 2 and 4, welding material 260 is applied in the areas of the juncture between the rear wall 204 and outer lateral side wall 206 of the front pillar 110 and the upper wall 132 and step portion 190 of the side sill 120 and in the areas of the juncture between the inner lateral side wall 138 of the side sill 120 and the inner lateral side wall 208 of the front pillar 110. Further, the inner lateral side wall 138 of the side sill 120 includes at least one opening 264 adapted to define a welding location between the inner lateral side wall 138 of the side sill 120 and the inner lateral side wall 208 of the front pillar 110. As depicted, a pair of openings 264 is provided and welding material 260 is applied in the openings 264. It should be appreciated that welding the front pillar 110 to the side sill 120 in different planes reduces the rotational moment in a side crash load. The welding on the inside of the inner lateral side wall 138 is on a side view plane so it is unaffected by the vertical position of the front pillar 110 and allows for movement in the positioning of the front pillar 110.

FIG. 4 illustrates a force or load distribution of the front pillar 110 and the side sill 120 as a result of a tire load (from impact of the forward wall 202 with a front tire), a separate front frame load and a side crash load. As depicted, each of the tire load and the side crash load is directed from the front pillar 110 into the walls 132-138 and strengthening ribs 140, 142 of the side sill 120, and the front frame load is directed from the side sill 120 into the front pillar 110. Therefore, as shown in FIG. 4, during a tire impact load or front frame load the front pillar 110 and the side sill 120 are both loaded at the same time increasing the strength of the connection, which minimizes moment and rotation from both the tire impact load and side crash load. By placing the inner lateral portion 232 of the front pillar 110 in the internal space 130 of the side sill 120 an efficient load transfer path is created between the two structural components. The front pillar 110 welded to the inner lateral side wall 138 of the side sill 120 allows for loading of the side sill. And the shear plane on the top of the side sill 120 is eliminated with the inner lateral portion 232 of the front pillar 110 being located in the side sill 120 and welded below the upper wall 132 of the side sill 120.

Accordingly, the front pillar 110 mounts both inside and on top of the side sill 120 and not on the side, and the connection there between is to the inside of the side sill 120 instead of to the outside of the side sill 120. There is no opening in the entire side sill 120 and the front pillar 110 does not extend through the side sill 120. Therefore, because the inner lateral portion 232 of the front pillar 110 only fits into the inner lateral portion 162 of the side sill 120 and does not extend through the entire side sill 120 machining cost and time is minimized. By positioning the front pillar 110 atop the side sill 120 the need for a tight trim tolerance is eliminated because there is clearance from the inside trim to the side sill horizontal rib 142. And the trim tolerance of the outside of the front pillar 110 does not affect the welds to the side sill inner side wall 138 because they are on the same slip plane.

Figure 5:
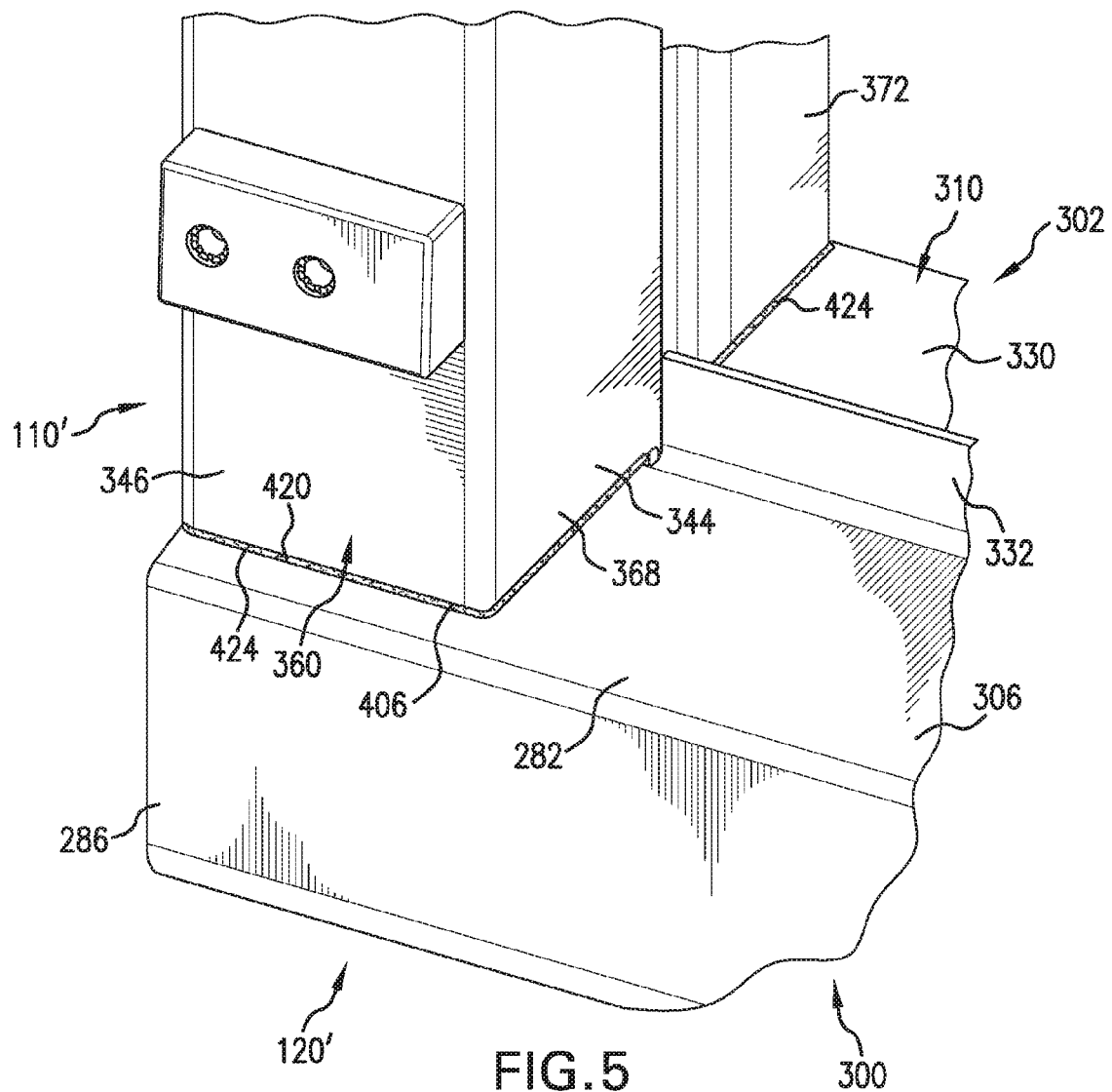
FIG. 5 is an outer lateral side perspective view of a connection between a side sill and a front pillar of the vehicle body of FIG. 1 according to another aspect of the present disclosure.
Figure 6B:
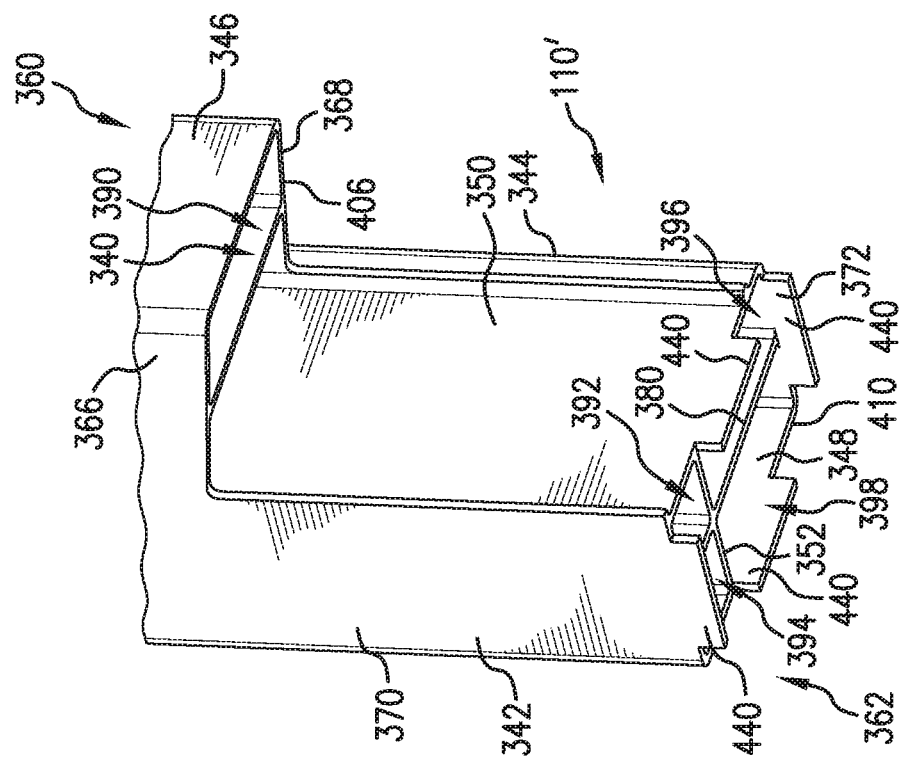
FIG. 6B is a perspective cross-sectional view of the front pillar of FIG. 5.
Figure 6A:
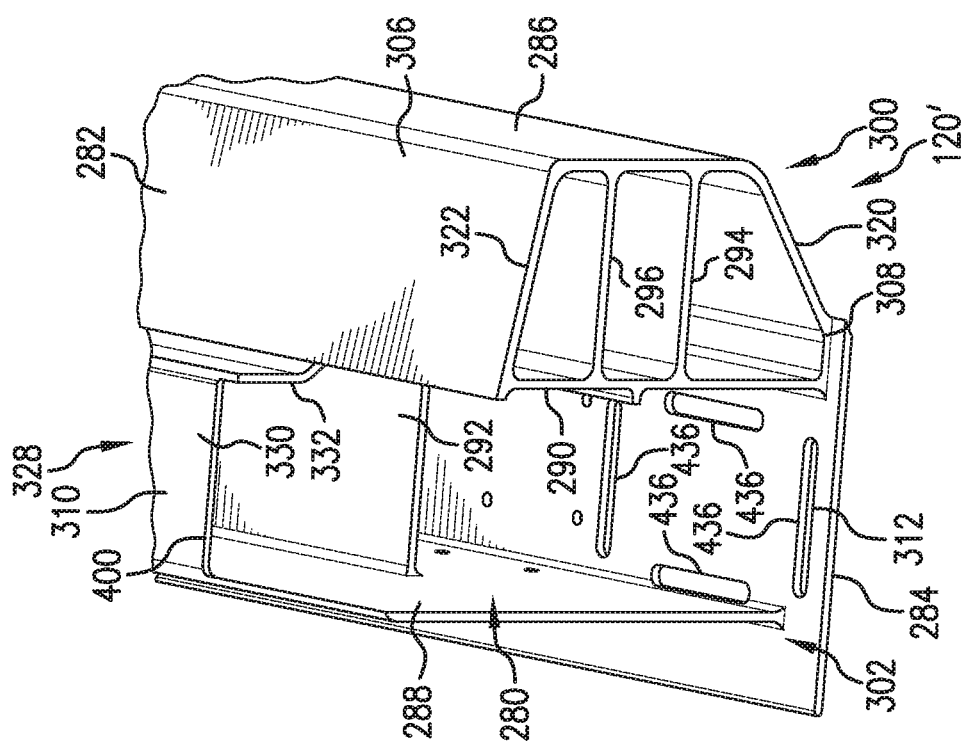
FIG. 6A is a perspective cross-sectional view of the side sill of FIG. 5.

FIG. 5 is an outer lateral side perspective view of a connection between a front pillar 110' and a side sill 120' of the vehicle body 100 according to another aspect of the present disclosure, and FIGS. 6A and 6B are perspective cross-section views of the side sill 120' and the front pillar 110'. As depicted, the side sill 120' is elongated in the longitudinal direction of the vehicle body 100 and has a hollow generally box-like cross-section having an internal space 280 therein which is defined by an upper wall 282, a lower wall 284, an outer lateral side wall 286, and an inner lateral side wall 288. Again, the side walls 286, 288 are located on, respectively, the outer and inner sides with respect to the vehicle body 100. In this sense, the side walls 286, 288 are referred to as the outer lateral side wall and the inner lateral side wall, respectively. The internal space 280 is partitioned by a plurality of strengthening ribs. According to the depicted embodiment, a first strengthening rib 290 is elongated in the longitudinal direction of the vehicle body and vertically oriented to connect respective inside faces of the upper and lower walls 282, 284. A second rib 292 is elongated in the longitudinal direction of the vehicle body and is horizontally oriented to connect an inside face of the inner lateral side wall 288 and the first rib 290. A third rib 294 and a fourth rib 296 are each elongated in the longitudinal direction of the vehicle body and horizontally oriented to connect an inside face of the outer lateral side wall 286 and the first rib 290.

The first rib 290 separates the side sill 120' into an outer lateral portion 300 and an inner lateral portion 302. The outer lateral portion 300 is therefore defined by an outer lateral section 306 of the upper wall 282, an outer lateral section 308 of the lower wall 284, the outer side wall 286, an outer face of the first rib 290 and the third and fourth ribs 294, 296. The inner lateral portion 302 is defined by an inner lateral section 310 of the upper wall 282, an inner lateral section 312 of the lower wall 284, the inner side wall 288, an inner face of the first rib 290 and the second rib 292. The side sill 120' further includes a first angled wall portion 320 extending in the longitudinal direction of the vehicle body 100 and connecting the lower wall 284 and the outer side wall 286. A second angled wall portion 322 extends in the longitudinal direction of the vehicle body 100 and connects the upper wall 282 and the outer side wall 286 Each of the first and second angled wall portions 320, 322 defines part of the outer lateral portion 306 of the side sill 120'. As shown, the first angled wall portion 320 defines part of the outer lateral section 308 of the lower wall 282, and the second angled wall portion 322 defines part of the outer lateral section 306 of the upper wall 282. The side sill 120' further includes a step portion 328 provided on the inner lateral section 310 of the upper wall 282. The step portion 328 has a hollow generally box-like cross-section and is defined by an upper portion of the inner side wall 288, the second rib 292, an upper horizontal wall part 330, and an outer vertical wall part 332. The outer vertical wall part 332 can be located laterally inwardly of the first rib 290.

The front pillar 110' has an internal space 340 defined by a forward wall 342, a rear wall 344, an outer lateral side wall 346, and an inner lateral side wall 348. The internal space 340 is partitioned by a longitudinally extending first strengthening rib 350 and a laterally extending second strengthening rib 352. As depicted, the second rib 352 connects the first rib 350 and an inside face of the inner side wall 348. The first rib 350 separates the front pillar 110' into an outer lateral portion 360 and an inner lateral portion 362. Accordingly, the outer lateral portion 360 of the front pillar 110' is defined by an outer lateral section 366 of the front wall 342, an outer lateral section 368 of the rear wall 344, the outer side wall 346 and an outer face of the first rib 350. The inner lateral portion 362 of the front pillar 110' is defined by an inner lateral section 370 of the forward wall 342, an inner lateral section 372 of the rear wall 344, the inner side wall 348 and an inner face of the first rib 350. As shown, the inner lateral portion 362 of the front pillar 110' can have a length greater than a length of the outer lateral portion 360 of the front pillar 110'.

The inner lateral portion 362 of the front pillar 110' is further defined by a longitudinally extending third rib 380 extending parallel to the first rib 350. The third rib 380 intersects the second rib 352 and connects respective inside faces of the forward and rear walls 342, 344. The first rib 350, second rib 352, and third rib 380 separate the front pillar 110' into a plurality of interior hollow portions, and more particularly into five interior hollow portions 390 to 398. The outer lateral portion 360 of the front pillar 110' solely defines the hollow portion 390. The inner lateral portion 362 of the front pillar 110' defines the remaining hollow portions 392 to 398. The hollow portions 392, 394, which are defined by a forward portion of the inner side wall 348, the first rib 350, the second rib 352 and the inner lateral section 370 of the forward wall 342 are dimensioned smaller than the hollow portions 396, 398, which are defined by a rear portion of the inner side wall 348, the first and second ribs 350, 352 and the inner lateral section 372 of the rear wall 344. The two smaller dimension hollow portions 392, 394 are configured as energy absorbing lobes of the inner lateral portion 362 of the front pillar 110'. The third rib 380 can includes a section rearward of the second rib 352 having a variable thickness which is adapted to control a crush distance of the two smaller dimension hollow portions 392, 394 and transfer load from the forward wall 342 to the rear wall 344.

Figure 7:
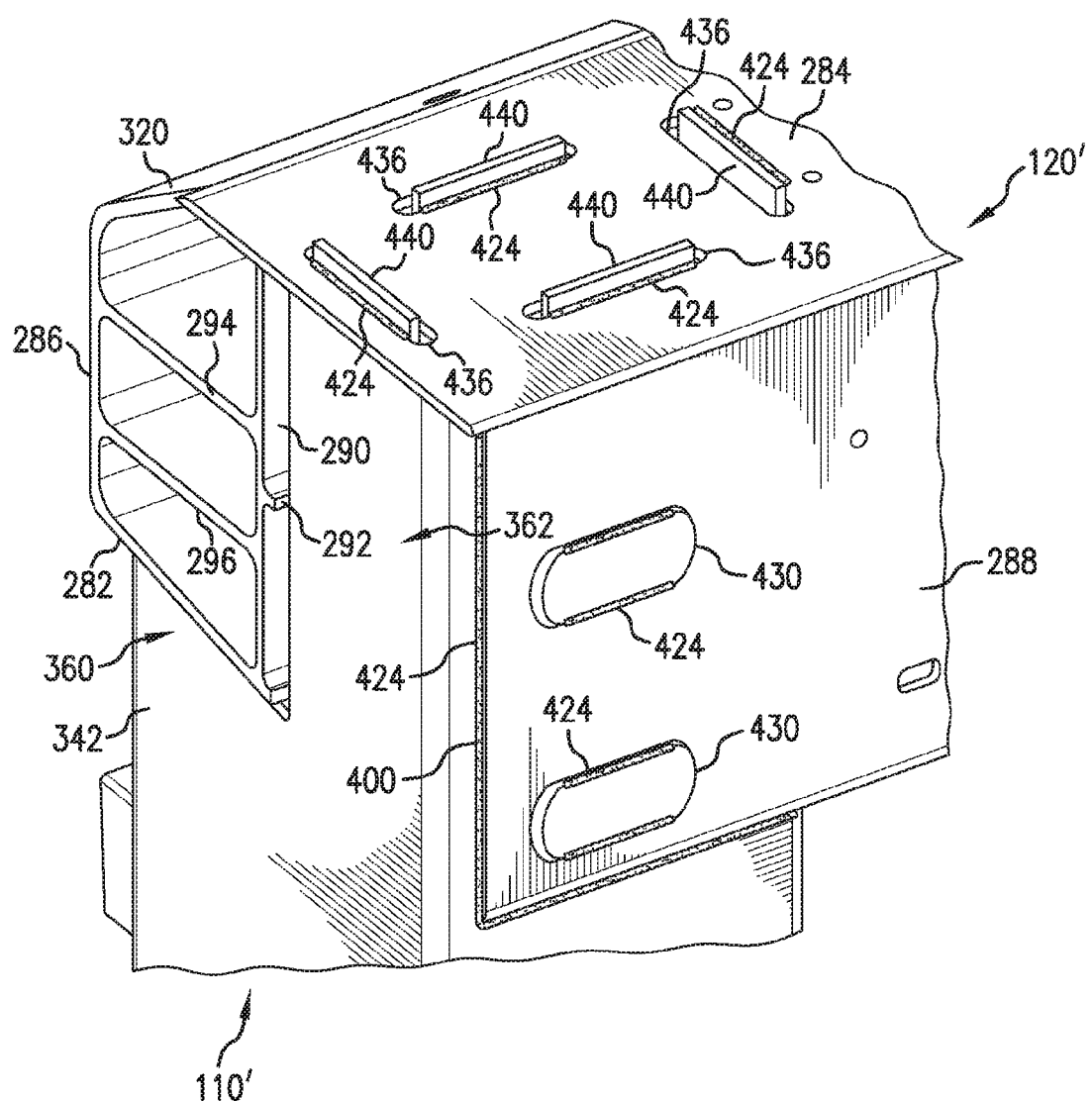
FIG. 7 is a bottom perspective view of the connection of FIG. 5.
Figure 8:
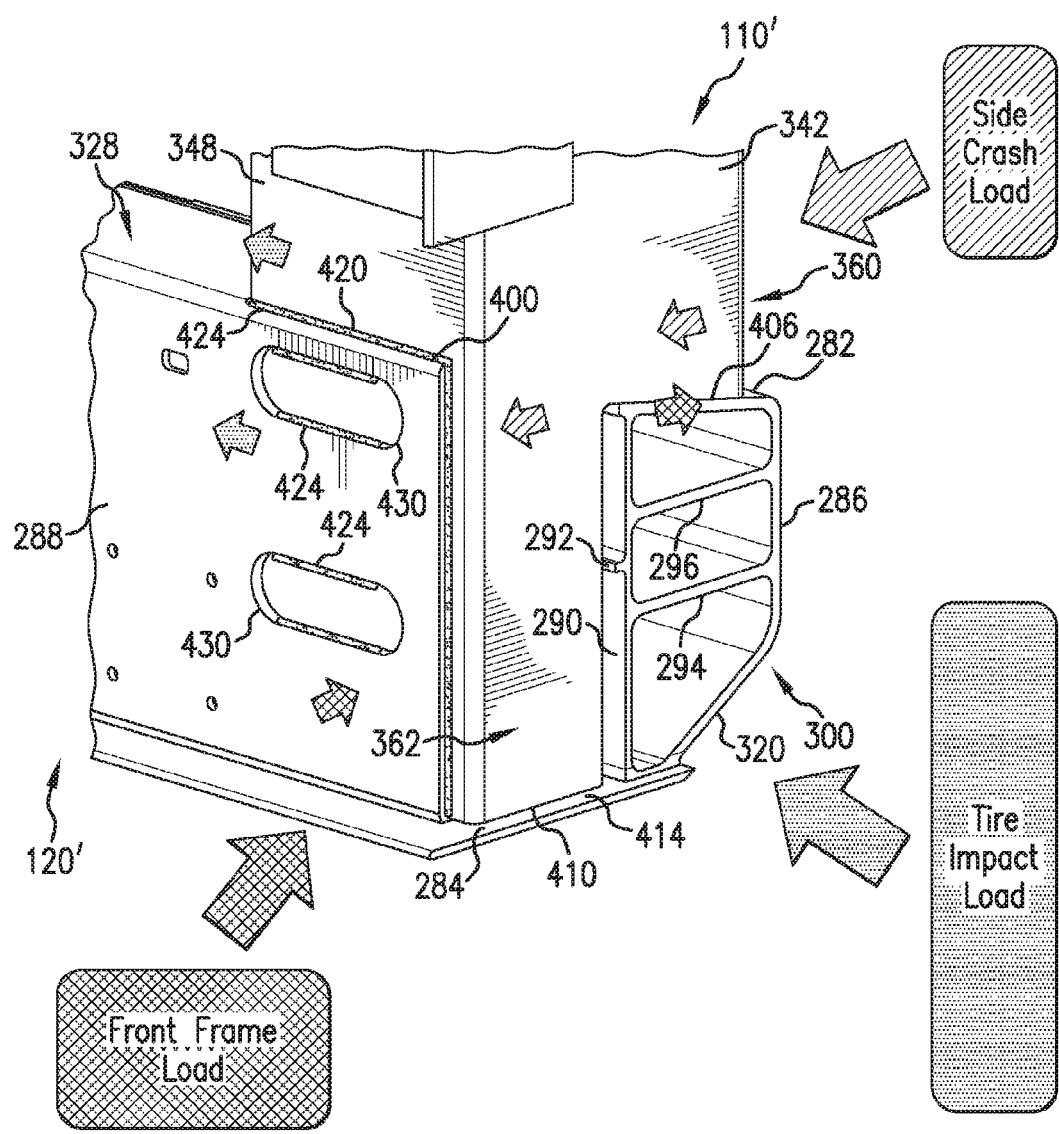
FIG. 8 depicts a force or load distribution of the connection of FIG. 5.

With reference now to FIGS. 7 and 8, the inner lateral portion 302 of the side sill 120', and more particularly the step portion 328, includes a cutout 400 extending vertically therethrough to the lower wall 284. The inner lateral portion 362 of the front pillar 110' is disposed through and secured in the cutout 400 of the inner lateral side sill portion 302 such that the first rib 350 of the front pillar faces the vertical rib 290 of the side sill 120'. An axial end face 406 of the outer lateral portion 360 of the front pillar 110' is in abutment with the outer lateral portion 300 of the side sill 120' (FIG. 5). More particularly, the axial end face 406 sits atop the outer lateral section 306 of the side sill upper wall 282, and an axial end face 410 of the inner lateral portion 362 of the front pillar 110' is in abutment with and supported by the lower wall 284 of the side sill 120'. A gap 414 is provided at the contact between the inner lateral portion 362 and the lower wall 284 which allows for larger trim tolerances to eliminate a machining process generally associated with the connection between the front pillar and side sill. The front pillar 110' is welded to the side sill 120' along a juncture or interface 420 between the front pillar 110' and the side sill 120'. In the depicted embodiment, the font pillar 110' is welded to the side sill 120' at the location where the axial end face 406 of the outer lateral portion 360 of the front pillar 110' sits atop the outer lateral section 306 of the side sill 120'. The front pillar 110' is also welded to the inner lateral side wall 288 of the side sill 120'. As shown, welding material 424 is applied in the areas of the juncture between the rear wall 344 and outer lateral side wall 346 of the front pillar 110' and the upper wall 282 and step portion 328 of the side sill 120' and in the areas of the juncture between the inner lateral side wall 288 of the side sill 120' and the inner lateral side wall 348 of the front pillar 110'. Further, the inner lateral side wall 288 of the side sill 120' includes at least one opening 430 adapted to define a welding location between the inner lateral side wall 288 and inner lateral side wall 348 of the front pillar 110'. As depicted, a pair of openings 430 is provided and welding material 424 is applied in the openings 430. Again, welding the front pillar 110' to the side sill 120' in different planes reduces the rotational moment in a side crash load. The welding on the inside of the inner lateral side wall 288 of the side sill 120' is on a side view plane so it is unaffected by the vertical position of the front pillar 110' and allows for movement in the positioning of the front pillar 110'.

With reference to FIGS. 6A, 6B and 7, to further enable proper connection of the front pillar 110' and side sill 120', the lower wall 284 of the side sill 120' includes at least one opening 436 and the inner lateral portion 362 of the front pillar 110' includes at least one tab 440 disposed through the at least one opening 436. In the depicted embodiment, each of the forward wall 342, rear wall 344, inner lateral side wall 348 and first rib 350 of the front pillar 110' includes a tab 440. The lower wall 284 of the side sill 120' includes four openings 436 adapted to receive the tabs 440. Once positioned in the openings 246, welding material 424 is applied in the areas of the juncture between the lower wall 284 and the tabs 440. This welding on the lower wall 284 of the side sill 120' enables the entire side sill 120' to be connected to the front pillar 110'.

FIG. 8 illustrates a force or load distribution of the front pillar 110' and the side sill 120' as a result of a tire load (from impact of the forward wall 342 with a front tire), a separate front frame load and a side crash load. As depicted, each of the tire load and the side crash load is directed from the front pillar 110' into the walls and strengthening ribs of the side sill 120', and the front frame load is directed from the side sill 120' into the front pillar 110'. Therefore, as shown in FIG. 8, during a tire impact load or front frame load the front pillar 110' and the side sill 120' are both loaded at the same time increasing the strength of the connection, which minimizes moment and rotation from both the tire impact load and side crash load. By placing the inner lateral portion 362 of the front pillar 110' in the internal space 280 of the side sill 120' an efficient load transfer path is created between the two structural components. The front pillar 110' welded to the inner lateral side wall 288 of the side sill 120' allows for loading of the side sill 120'. The welding of the front pillar 110' to the lower wall 284 of the side sill 120' engages the entire side sill 120' for body rigidity and crash. And the shear plane on the top of the side sill 120' is eliminated with the inner lateral portion 362 of the front pillar 110' being located in the side sill 120' and welded below the upper wall 282 of the side sill 120'.

Accordingly, the front pillar 110' mounts both inside and on top of the side sill 120' and not on the side, and the connection there between is to the inside of the side sill 120' instead of to the outside of the side sill 120'. There is no opening in the entire side sill 120' and the front pillar does not extend through the side sill 120'. Therefore, because the front pillar 110' only fits into the inside part of the side sill 120' and does not extend through the entire side sill 120' machining cost and time is minimized. And the trim tolerance of the outside of the front pillar 110' does not affect the welds to the side sill inner side wall 288 because they are on the same slip plane.

Figure 9:
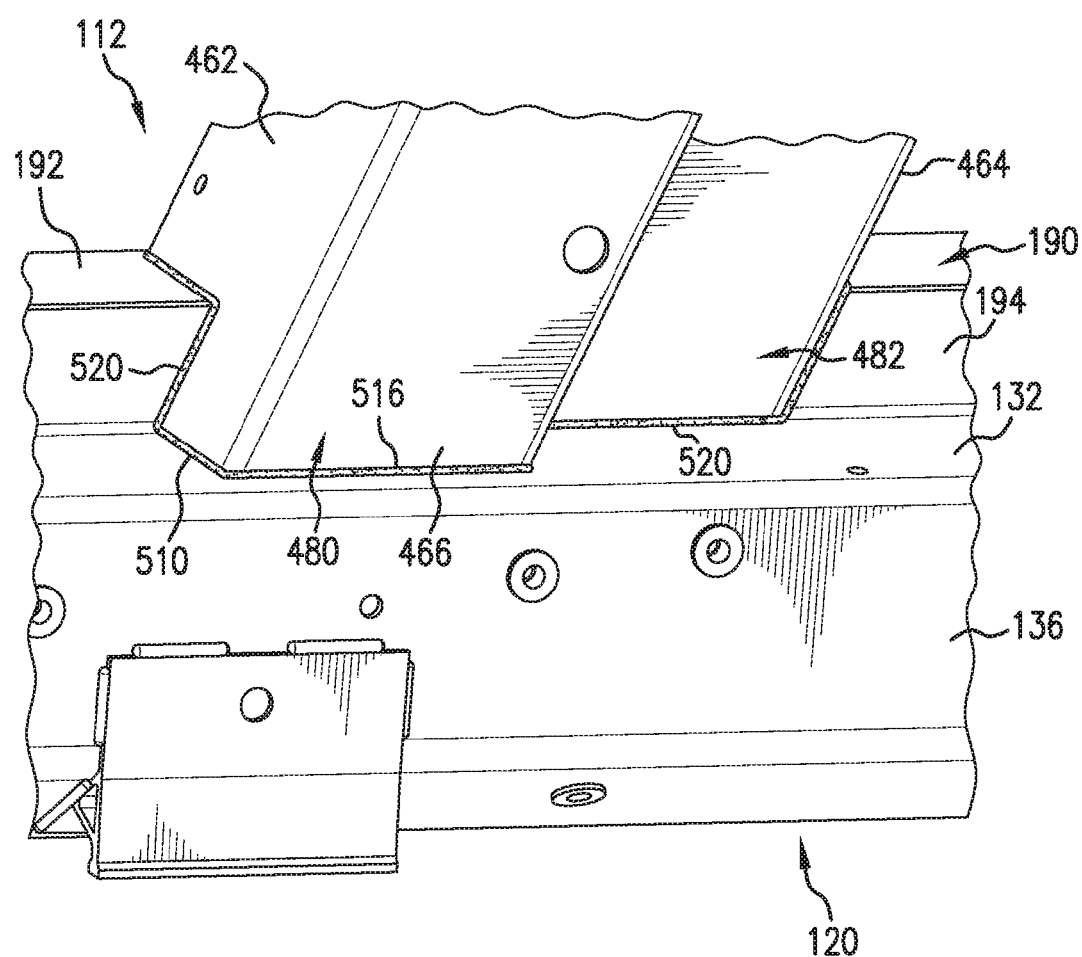
FIG. 9 is an outer lateral side perspective view of a connection between a side sill and a center pillar of the vehicle body of FIG. 1 according to one aspect of the present disclosure.
Figure 10:
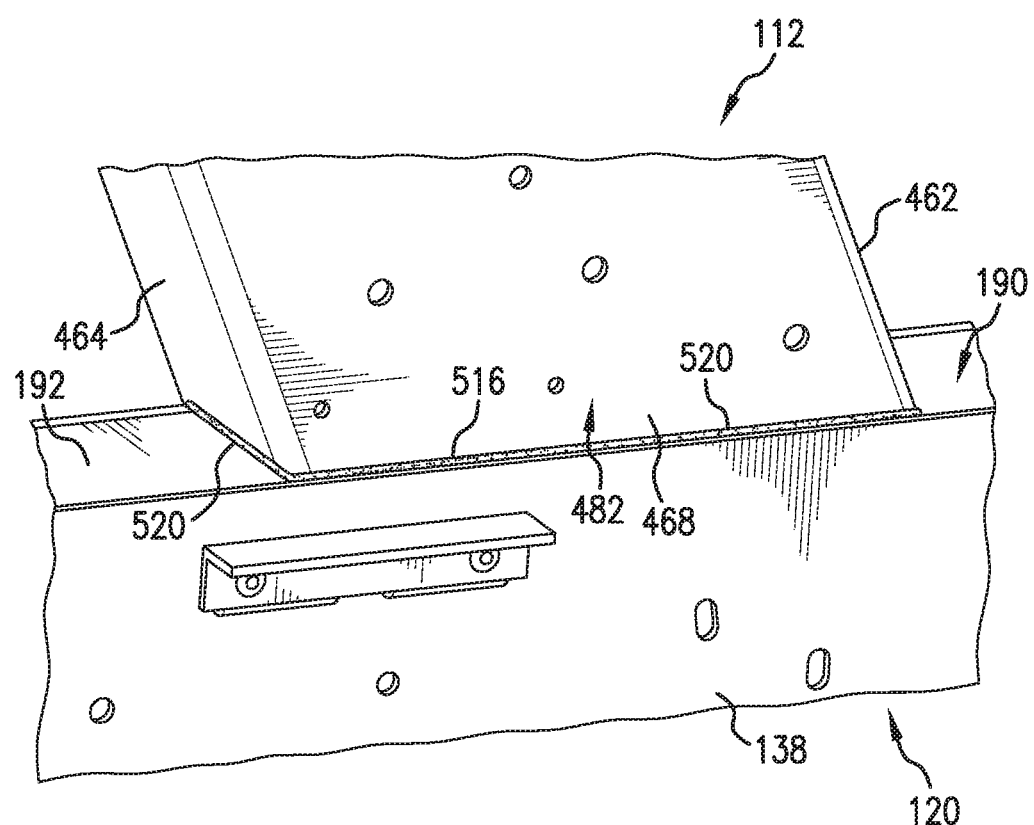
FIG. 10 is an inner lateral side perspective view of the connection of FIG. 9.

FIGS. 9 and 10 are respective outer and inner lateral side perspective views of a connection between the side sill 120 and the center pillar 112 of the vehicle body 100 according to one aspect of the present disclosure, and FIGS. 11A and 11B are perspective cross-section views of the side sill 120 and center pillar 112. As indicated previously, the side sill 120 includes the upper wall 132, the lower wall 134, the outer lateral side wall 136, and the inner lateral side wall 138 (the lower wall is not depicted). The step portion 190 is provided on the upper wall 132 and is defined by an upper portion of the inner side wall 138, the inner lateral section 170 of the upper wall 132, the upper horizontal wall part 192, and the outer vertical wall part 194. The step portion 190 has a cutout 454 extending vertically therethrough to the inner lateral section 170.

The center pillar 112 is elongated in the vertical direction of the vehicle body 100 and has a hollow generally box-like cross-section having an internal space 460 therein which is defined by forward wall 462, a rear wall 464, an outer lateral side wall 466, and an inner lateral side wall 468. Again, the side walls 466, 468 are located on, respectively, the outer and inner sides with respect to the vehicle body 100. In this sense, the side walls 466, 468 are referred to as the outer lateral side wall 466 and the inner lateral side wall 468, respectively. With particular reference to FIG. 11B, the internal space 460 is partitioned by a plurality of strengthening ribs. According to the depicted embodiment, the plurality of ribs includes a longitudinally extending first rib 470 and laterally extending second and third ribs 472, 474. The first rib 470 at least partially defines a rear offset part of the outer side wall 466. Each of the second rib 472 and third rib 474 connects the first rib 470 and an inside face of the inner side wall 468. The first rib 470 separates the center pillar 112 into an outer lateral portion 480 and an inner lateral portion 482. Accordingly, the outer lateral portion 480 of the center pillar 112 is defined by an outer lateral section 486 of the front wall 462, an outer lateral section 488 of the rear wall 464, the outer lateral side wall 466 and an outer face of the first rib 470. The inner lateral portion 482 of the center pillar 112 is defined by an inner lateral section 490 of the forward wall 462, an inner lateral section 492 of the rear wall 464, the inner lateral side wall 468 and an inner face of the first rib 470. As shown, the inner lateral portion 482 of the center pillar 112 can have a length greater than a length of the outer lateral portion 480 of the center pillar 112. The first rib 470, second rib 472, and third rib 474 further separate the center pillar 112 into a plurality of interior hollow portions, and more particularly into four interior hollow portions 500 to 506. The outer lateral portion 480 of the center pillar 112 solely defines the hollow portion 500. The inner lateral portion 482 of the center pillar defines the remaining hollow portions 502 to 506. It should be appreciated that the hollow portions 500 to 506 can be adapted as energy absorbing lobes of the center pillar 112.

With reference back to FIGS. 9 and 10, the outer lateral portion 480 of the center pillar 112 includes an axial end face 510 in abutment with the upper wall 132 of the side sill 120. The inner lateral portion 482 of a center pillar 112 is disposed though and secured in the cutout 454 and includes an axial end face 512 in abutment with the inner lateral section 170 of the upper wall 132 of the side sill 120. The center pillar 112 is welded to the side sill 120 at a juncture or interface 516 between the two structural components. Particularly, the center pillar 112 is welded to the side sill 120 on the outside where the outer lateral portion 480 sits on top of the side sill 120, and is further welded to the inside side wall 138 of the side sill 120. As shown, welding material 520 is applied in the areas of the juncture between center pillar 112 forward and rear walls 462, 464 and the horizontal and vertical wall parts 192, 194 of the side sill step portion 190, between the center pillar outer side wall 466 and the side sill upper wall 132, and between the center pillar inner side wall 468 and the side sill inner lateral side wall 138. It should be appreciated that welding the center pillar 112 to the side sill 120 in different planes reduces the rotational moment in a side crash load. The center pillar 112 is set onto the upper wall 132 of the side sill 120 to set the position of the center pillar 112 on the side sill 120. The adjustment for the center pillar vertical position is absorbed at the top of the center pillar 112. The welding on the inside side wall 138 of the side sill 120 allows for vertical positioning of the center pillar 112 and is on a side view plane so it is unaffected by the vertical position of the center pillar 112. The welding on the forward and rear walls 462, 464 of the center pillar 112 is unaffected by the vertical position of the center pillar 112 because it is on the same plane.

Figure 12:
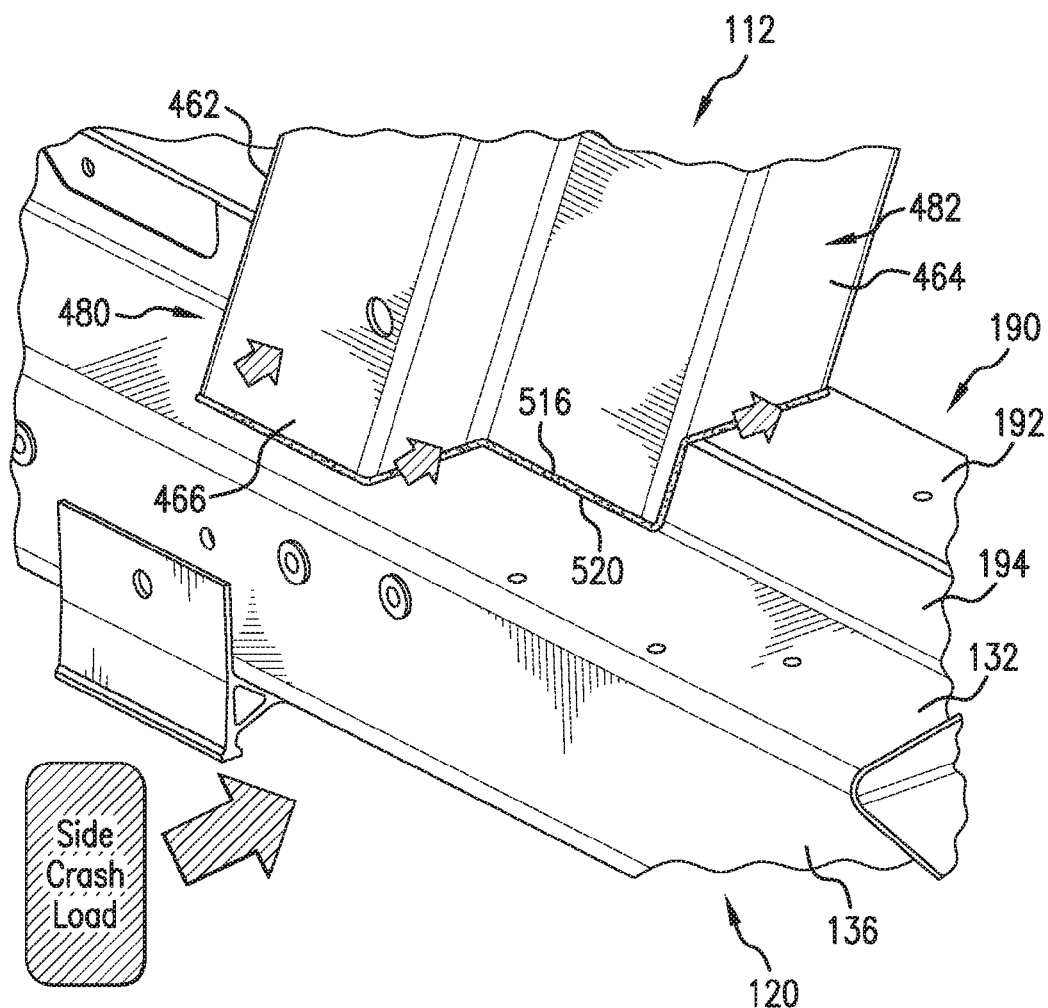
FIG. 12 depicts a force or load distribution of the connection of FIG. 9.

FIG. 12 illustrates a force or load distribution of the center pillar 112 and the side sill 120 as a result of a side crash load. As depicted, during a side crash load the center pillar 112 and the side sill 120 are both loaded at the same time increasing the strength of the connection. By placing the inner lateral portion 482 of the center pillar 112 in the internal space 130 of the side sill 120 an efficient load transfer path is created between the two structural components. The side crash load is transferred into the inner side wall 138 of the side sill 120, and the inner side wall 468 of the center pillar 112 welded to the inner side wall 138 of the side sill 120 allows for loading of the side sill 120. The shear plane on the upper wall 132 of the side sill 120 is eliminated with the welding location on the forward and rear walls 462, 464 and the inner side wall 468 of the center pillar 112 being above the welding location of the outer side wall 466 of the center pillar 112. Therefore, because the center pillar 112 only fits into the inside part of the side sill 120 and does not go through the entire side sill 120 machining cost and time is minimized. And the trim tolerance on the bottom of the center pillar 112 does not affect the welds to the forward and rear walls 462, 464 and the inner side wall 468 because they are on the same slip plane.

Figure 13:
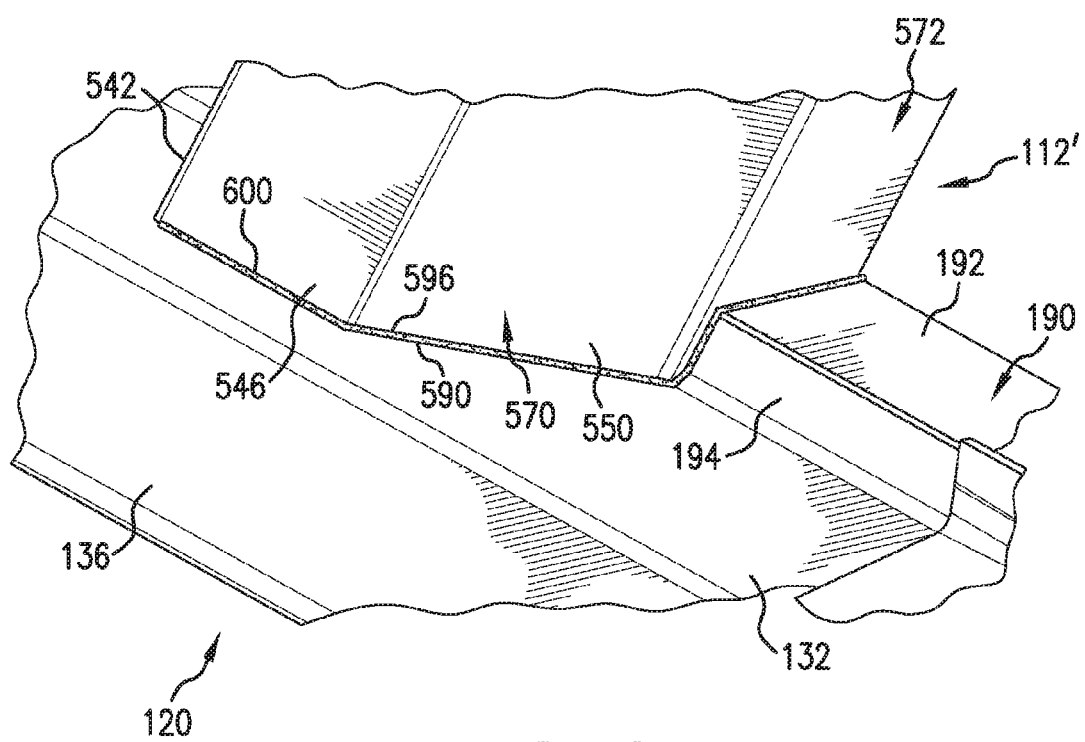
FIG. 13 is an outer lateral side perspective view of a connection between a side sill and a center pillar of the vehicle body of FIG. 1 according to another aspect of the present disclosure.
Figure 14:
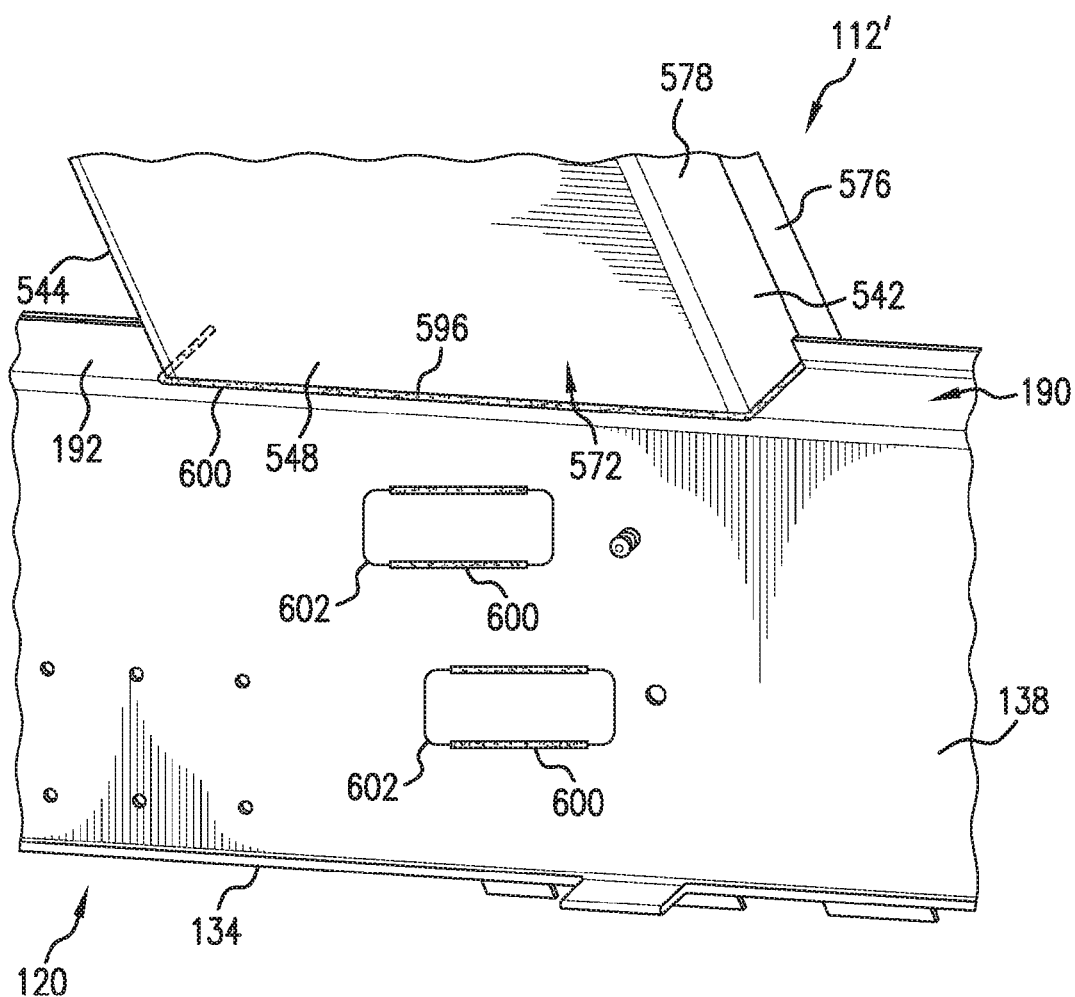
FIG. 14 is an inner lateral side perspective view of the connection of FIG. 13.
Figure 16B:
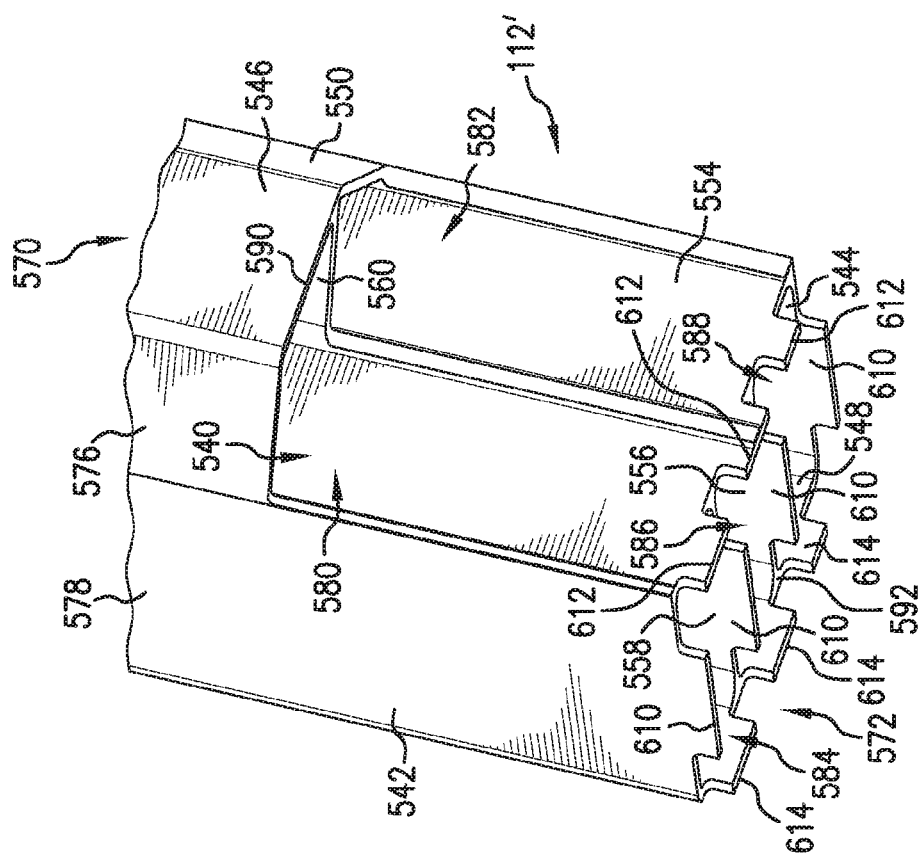
FIG. 16B is a perspective cross-sectional view of the center pillar of FIG. 13.
Figure 16A:
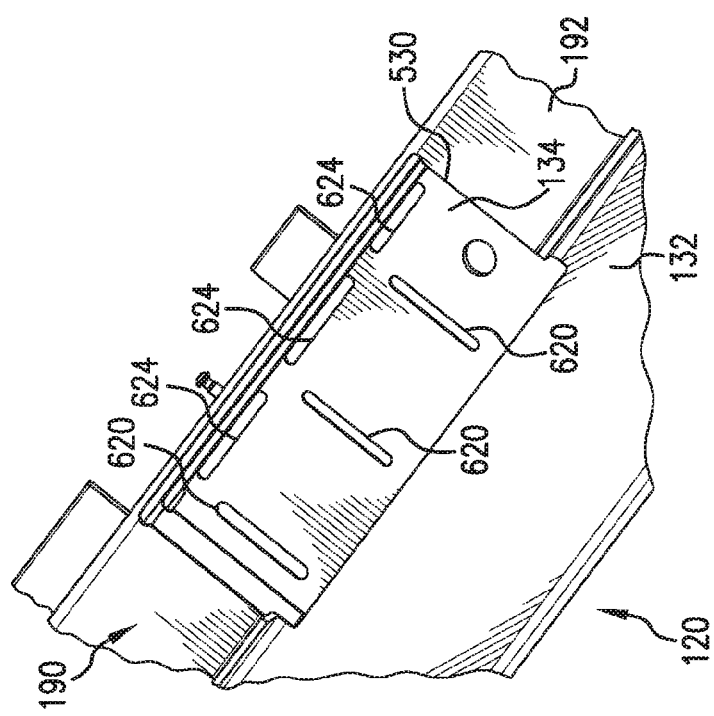
FIG. 16A is a perspective cross-sectional view of the side sill of FIG. 13.

FIGS. 13 and 14 are respective outer and inner lateral side perspective views of a connection between the side sill 120 and a center pillar 112' of the vehicle body 100 according to another aspect of the present disclosure, and FIGS. 16A and 16B are perspective cross-section views of the side sill 120 and center pillar 112'. As indicated previously, the side sill 120 includes the upper wall 132, the lower wall 134, the outer lateral side wall 136, and the inner lateral side wall 138. The step portion 190 is provided on the upper wall 132 and is defined by an upper portion of the inner side wall 138, the upper horizontal wall part 192, and the outer vertical wall part 194. The step portion has a cutout 530 extending vertically therethrough to the lower wall 134.

The center pillar 112' is elongated in the vertical direction of the vehicle body 100 and has a hollow generally box-like cross-section having an internal space 540 therein which is defined by forward wall 542, a rear wall 544, an outer lateral side wall 546, and an inner lateral side wall 548. Again, the side walls 546, 548 are located on, respectively, the outer and inner sides with respect to the vehicle body 100. In this sense, the side walls 546, 548 are referred to as the outer lateral side wall and the inner lateral side wall, respectively. In the depicted embodiment, a rear part of the outer side wall 546 defines an angled wall portion 550 canted toward and connecting to the rear wall 544.

With particular reference to FIG. 16B, the internal space 540 is partitioned by a plurality of strengthening ribs. According to the depicted embodiment, the plurality of ribs includes a longitudinally extending first rib 554 and laterally extending second, third and fourth ribs 556, 558, 560. The first rib 554 connects inside faces of the forward and rear walls 542, 544 and separates the center pillar 112' into an outer lateral portion 570 and an inner lateral portion 572. Each of the second rib 556 and third rib 558 connects the first rib 554 and an inside face of the inner side wall 548. The fourth rib 560 connects an inside face of the outer side wall 546 at the location of the angled wall portion 550 and the first rib 554. The outer lateral portion 570 of the center pillar 112' is defined by an outer lateral section 576 of the front wall 542, the outer side wall 546 and an outer face of the first rib 554. The inner lateral portion 572 of the center pillar 112' is defined by an inner lateral section 578 of the forward wall 542, the rear wall 544, the inner side wall 548 and an inner face of the first rib 554. As shown, the inner lateral portion 572 of the center pillar 112' can have a length greater than a length of the outer lateral portion 570 of the center pillar 112'. The first rib 554, second rib 556, third rib 558 and fourth rib 560 further separate the center pillar 112' into a plurality of interior hollow portions, and more particularly into five interior hollow portions 580 to 588. The outer lateral portion 570 of the center pillar 112' defines the hollow portions 580, 582. The inner lateral portion 572 of the center pillar 112' defines the remaining hollow portions 584 to 588. It should be appreciated that the hollow portions 580 to 588 can be adapted as energy absorbing lobes of the center pillar 112'.

With reference back to FIGS. 13 and 14, the outer lateral portion 570 of the center pillar 112' includes an axial end face 590 in abutment with the upper wall 132 of the side sill 120. The inner lateral portion 572 of a center pillar 112' is disposed though and secured in the cutout 530 and includes an axial end face 592 in abutment with lower wall 134 of the side sill 120. The center pillar 112' is welded to the side sill 120 at a juncture or interface 596 between the two structural components. Particularly, the center pillar 112' is welded to the side sill 120 on the outside where the outer lateral portion 570 sits on top of the side sill 120, and is further welded to the inside side wall 138 of the side sill 120. As shown, welding material 600 is applied in the areas of the juncture between center pillar forward and rear walls 542, 544 and the horizontal and vertical wall parts 192, 194 of the side sill step portion 190, between the center pillar outer side wall 546 and the side sill upper wall 132, and between the center pillar inner side wall 548 and the side sill inner lateral side wall 138. Further, according to the depicted embodiment of FIG. 14, the inner lateral side wall 138 of the side sill 120 includes at least one opening 602 adapted to define a welding location between the inner lateral side wall 138 of the side sill 120 and the inner lateral side wall 548 of the center pillar 112'. As depicted, a pair of openings 602 is provided and welding material 600 is applied in the openings 602.

Figure 15:
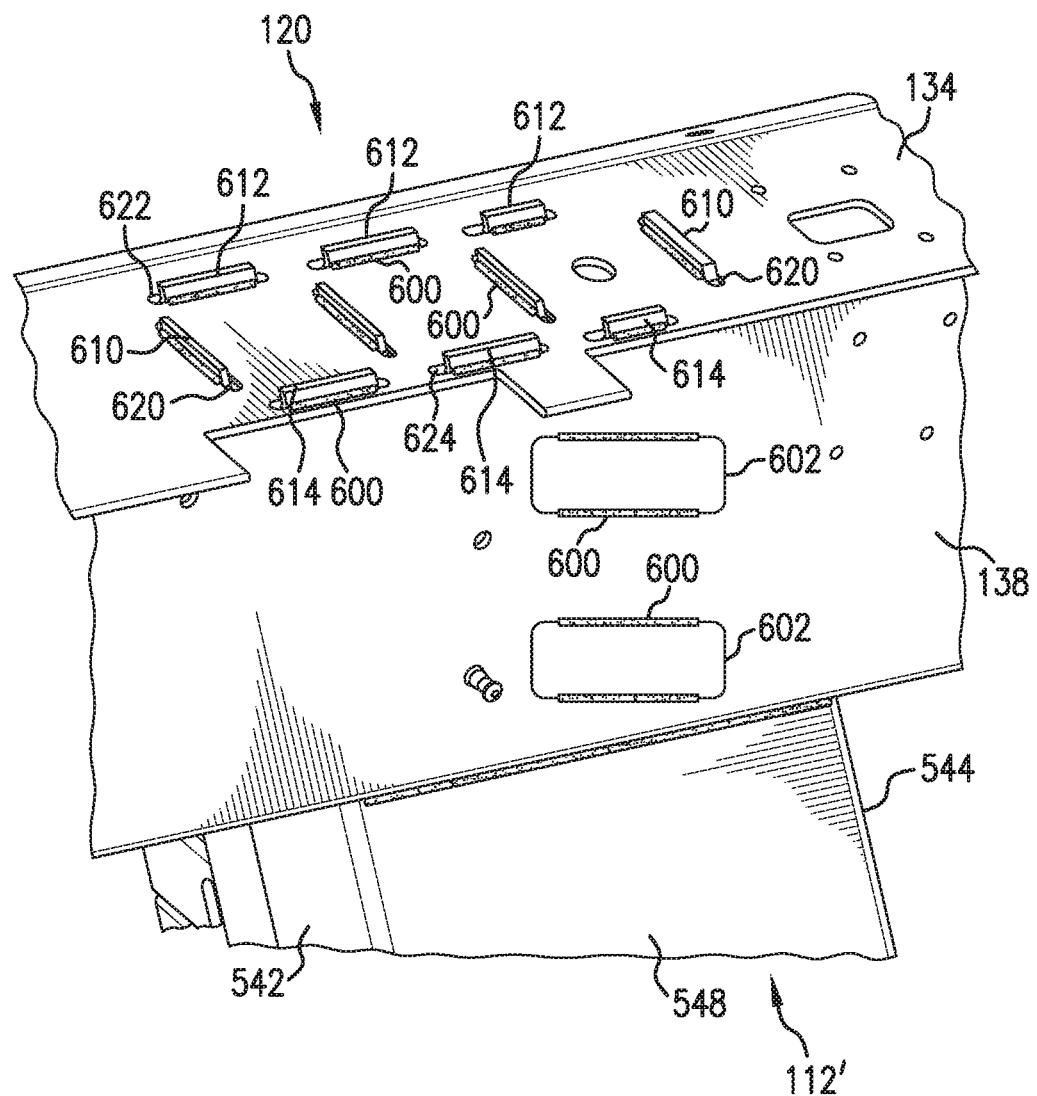
FIG. 15 is a bottom perspective view of the connection of FIG. 13.

With reference to FIGS. 15, 16A and 16B, to further enable proper connection of the center pillar 112' and side sill 120, the lower wall 134 of the side sill 120 includes at least one opening and the inner lateral portion 572 of the center pillar 112' includes at least one tab disposed through the at least one opening. In the depicted embodiment, each of the forward wall 542, rear wall 544, second rib 556 and third rib 558 includes a tab 610. Each of the respective inner lateral side wall 548 and first rib 560 includes spaced apart tabs 612, 614. The lower wall 134 of the side sill 120 includes a plurality of openings 620, 622, 624 adapted to receive the respective tabs 610, 612, 614. Once positioned in the openings, welding material 600 is applied in the areas of the juncture between the lower wall 134 and the tabs 610, 612, 614. This welding on the lower wall 134 of the side sill 120 enables the entire side sill 120 to be connected to the center pillar 112'.

Again, welding the center pillar 112' to the side sill 120 in different planes reduces the rotational moment in a side crash load. The center pillar 112' is set onto the upper wall 132 of the side sill 120 to set the position between the structural components, and the tabs 610, 612, 614 of the center pillar 112' are dimensioned to accommodate vertical positional tolerance. The adjustment for the center pillar vertical position is absorbed at the top of the center pillar 112'. The welding on the inner side wall 138 of the side sill 120 is on a side view plane so it is unaffected by the vertical position of the center pillar 112'. Similarly, the welding on the forward and rear walls 542, 544 of the center pillar 112' is unaffected by the vertical position of the center pillar 112' because it is on the same plane. The welding between the center pillar 112' to the lower wall 134 of the side sill 120 engages the entire side sill 120 for body rigidity and crash.

Figure 17:
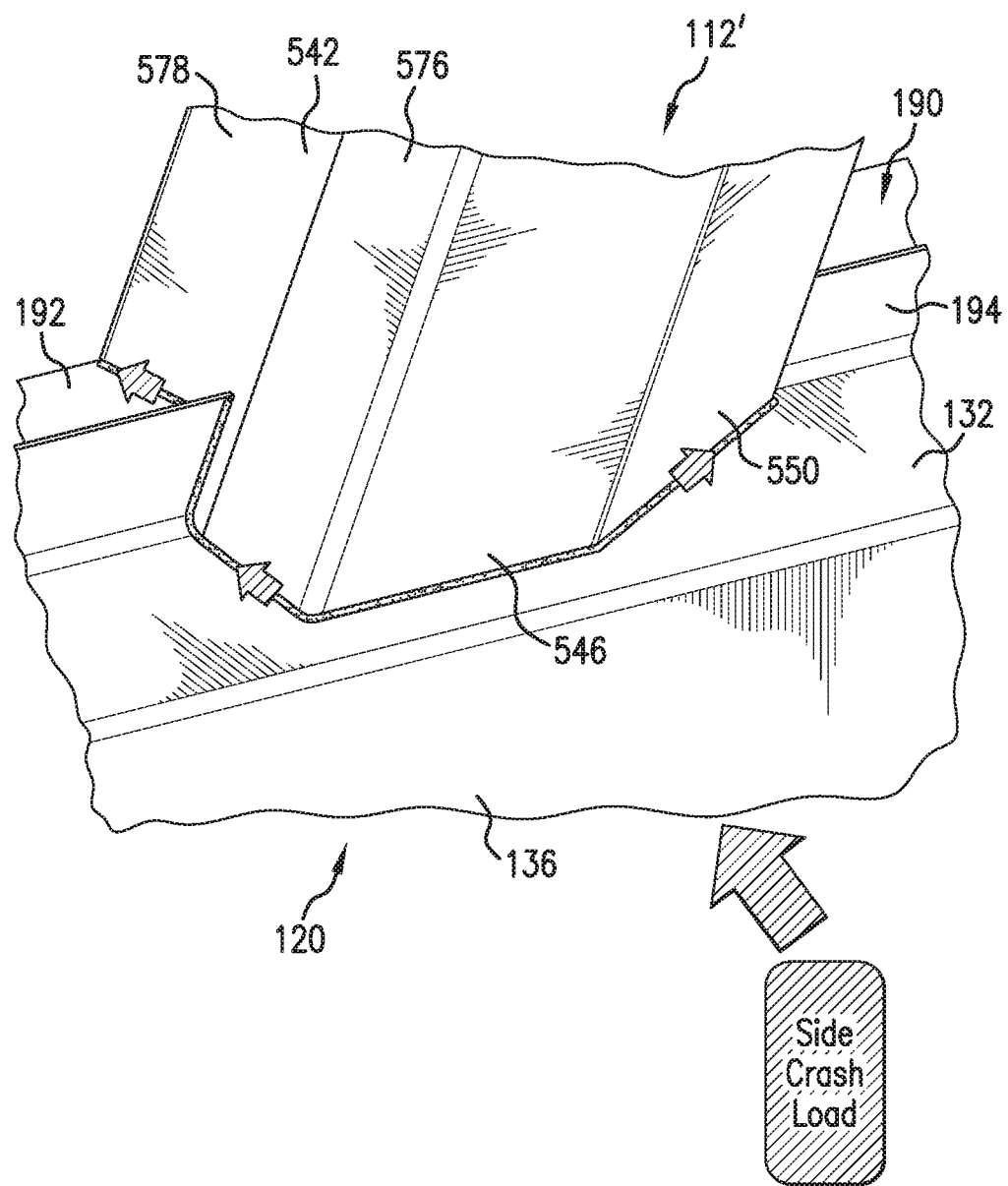
FIG. 17 depicts a force or load distribution of the connection of FIG. 13.

FIG. 17 illustrates a force or load distribution of the center pillar 112' and the side sill 120 as a result of a side crash load. As depicted, during a side crash load the center pillar 112' and the side sill 120 are both loaded at the same time increasing the strength of the connection. By placing the inner lateral portion 572 of the center pillar 112' in the internal space 130 of the side sill 120 an efficient load transfer path is created between the two structural components. The side crash load is transferred into the inner side wall 138 of the side sill 120, and the inner side wall 548 of the center pillar 112' welded to the inner side wall 138 of the side sill 120 allows for loading of the side sill 120. The shear plane on the upper wall 132 of the side sill 120 is eliminated with the welding location on the forward and rear walls 542, 544 and the inner side wall 548 of the center pillar 112' being above the welding location of the outer side wall 546 of the center pillar 112'. Therefore, because the center pillar 112' only fits into the inside part of the side sill 120 and does not go through the entire side sill 120 machining cost and time is minimized. And the trim tolerance on the bottom of the center pillar 112' does not affect the welds to the forward and rear walls 542, 544 and the inner side wall 548 because they are on the same slip plane.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle frame structure comprising:
   a side sill extending elongated in a longitudinal direction of a vehicle, the side sill having an internal space partitioned by a vertical rib and a horizontal rib intersecting the vertical rib, the vertical rib separating the side sill into an outer lateral side sill portion and an inner lateral side sill portion, the inner lateral side sill portion including a step portion having a cutout extending vertically therethrough; and
   a pillar having an internal space partitioned by a longitudinally extending first rib and a laterally extending second rib intersecting the first rib, the first rib separating the pillar into an outer lateral pillar portion and an inner lateral pillar portion,
   wherein the inner lateral pillar portion is disposed through and secured in the cutout of the inner lateral side sill portion, and an axial end face of the inner lateral pillar portion is in abutment with and supported by the horizontal rib of the side sill.

2. The vehicle frame structure of claim 1, wherein the outer lateral pillar portion includes an axial end face in abutment with the outer lateral side sill portion, the side sill and the pillar are welded to each other at an interface between the side sill and the pillar.

3. The vehicle frame structure of claim 1, wherein the horizontal rib of the side sill at least partially defines the step portion.

4. The vehicle frame structure of claim 1, wherein the horizontal rib interconnects inside faces of respective outer and inner lateral side walls of the side sill, and when positioned in the cutout the longitudinally extending first rib of the pillar faces the vertical rib of the side sill.

5. The vehicle frame structure of claim 1, wherein an inner lateral side wall of the side sill includes at least one opening adapted to define a welding location between the inner lateral side wall and pillar.

6. A vehicle frame structure comprising:
a side sill extending elongated in a longitudinal direction of a vehicle, the side sill having an internal space partitioned by a vertical rib and a horizontal rib intersecting the vertical rib, the vertical rib separating the side sill into an outer lateral side sill portion and an inner lateral side sill portion, the inner lateral side sill portion including a step portion having a cutout extending vertically therethrough; and
a pillar having an internal space partitioned by a longitudinally extending first rib and a laterally extending second rib intersecting the first rib, the first rib separating the pillar into an outer lateral pillar portion and an inner lateral pillar portion,
wherein the inner lateral pillar portion is disposed through and secured in the cutout of the inner lateral side sill portion, and an axial end face of the inner lateral pillar portion is in abutment with and supported by an inside face of a lower wall of the side sill.

7. The vehicle frame structure of claim 6, wherein the outer lateral pillar portion includes an axial end face in abutment with the outer lateral side sill portion, the side sill and the pillar are welded to each other at an interface between the side sill and the pillar.

8. The vehicle frame structure of claim 6, wherein an inner lateral side wall of the side sill includes at least one opening adapted to define a welding location between the inner lateral side wall and pillar.

9. The vehicle frame structure of claim 6, wherein the lower wall of the side sill includes at least one opening and the inner lateral pillar portion includes at least one tab disposed through the at least one opening.

10. The vehicle frame structure of claim 9, wherein the tab is welded to the lower wall.

11. The vehicle frame structure of claim 9, wherein the pillar includes a forward wall, a rear wall, an outer lateral side wall, and an inner lateral side wall, each of the forward wall, rear wall, inner lateral side wall and first rib includes a tab, and the lower wall of the side sill includes openings adapted to receive the tabs.

12. The vehicle frame structure of claim 11, wherein the second rib further includes a tab, and the lower wall of the side sill includes an opening adapted to receive the tab of the second rib.

13. A vehicle frame structure comprising:
a side sill extending elongated in a longitudinal direction of a vehicle, the side sill having an internal space partitioned by a vertical rib and a horizontal rib intersecting the vertical rib, the vertical rib separating the side sill into an outer lateral side sill portion and an inner lateral side sill portion, the inner lateral side sill portion including a cutout extending vertically therethrough; and
a pillar having an internal space partitioned by a longitudinally extending first rib and a laterally extending second rib intersecting the first rib, the first rib separating the pillar into an outer lateral pillar portion and an inner lateral pillar portion,
wherein the inner lateral pillar portion is disposed through and secured in the cutout of the inner lateral side sill portion, an axial end face of the outer lateral pillar portion is in abutment with the outer lateral side sill portion, and the side sill and the pillar are welded to each other along an interface between the side sill and the pillar, wherein the cutout is located in a step portion of the inner lateral side sill portion.

14. The vehicle frame structure of claim 13, wherein each of the side sill and pillar is an aluminum or aluminum alloy extruded member.

15. The vehicle frame structure of claim 13, wherein the horizontal rib of the side sill at least partially defines the step portion and an axial end face of the inner lateral pillar portion is in abutment with and supported by the horizontal rib.

16. The vehicle frame structure of claim 13, wherein the horizontal rib interconnects inside faces of respective outer and inner lateral side walls of the side sill and the inner lateral pillar portion includes an axial end face in abutment with and supported by the horizontal rib of the side sill.

17. The vehicle frame structure of claim 13, wherein an inner lateral side wall of the side sill includes at least one opening adapted to define a welding location between the inner lateral side wall and pillar.

18. The vehicle frame structure of claim 13, wherein when positioned in the cutout the longitudinally extending first rib of the pillar faces the vertical rib of the side sill.

19. The vehicle frame structure of claim 13, wherein an axial end face of the inner lateral pillar portion is in abutment with an inside face of a lower wall of the side sill.

20. The vehicle frame structure of claim 19, wherein the lower wall of the side sill includes at least one opening and the inner lateral pillar portion includes at least one tab disposed through the at least one opening.

21. The vehicle frame structure of claim 20, wherein the pillar includes a forward wall, a rear wall, an outer lateral side wall, and an inner lateral side wall, each of the forward wall, rear wall, inner lateral side wall and first rib includes a tab, and the lower wall of the side sill includes openings adapted to receive the tabs.

\* \* \* \* \*